(12) United States Patent
Shelley et al.

(10) Patent No.: US 9,262,713 B2
(45) Date of Patent: Feb. 16, 2016

(54) WELLBORE COMPLETION AND HYDRAULIC FRACTURING OPTIMIZATION METHODS AND ASSOCIATED SYSTEMS

(75) Inventors: Robert Shelley, Katy, TX (US); Nijat Guliyev, Houston, TX (US); Amir Nejad, Houston, TX (US)

(73) Assignee: CARBO Ceramics Inc., Houston, TX (US)

( * ) Notice: Subject to any disclaimer, the term of this patent is extended or adjusted under 35 U.S.C. 154(b) by 641 days.

(21) Appl. No.: 13/604,367

(22) Filed: Sep. 5, 2012

(65) Prior Publication Data

US 2014/0067353 A1  Mar. 6, 2014

(51) Int. Cl.
*G06G 7/48* (2006.01)
*G06N 3/04* (2006.01)
*E21B 43/26* (2006.01)

(52) U.S. Cl.
CPC .............. *G06N 3/0427* (2013.01); *E21B 43/26* (2013.01)

(58) Field of Classification Search
None
See application file for complete search history.

(56) References Cited

U.S. PATENT DOCUMENTS

| | | | |
|---|---|---|---|
| 5,012,675 A | 5/1991 | Koller et al. | |
| 6,018,497 A * | 1/2000 | Gunasekera | 367/72 |
| 6,832,159 B2 | 12/2004 | Smits et al. | |
| 7,054,753 B1 * | 5/2006 | Williams et al. | 702/13 |
| 7,509,245 B2 * | 3/2009 | Siebrits et al. | 703/10 |
| 7,516,793 B2 | 4/2009 | Dykstra | |
| 7,565,277 B2 * | 7/2009 | Basquet et al. | 703/10 |
| 7,925,482 B2 | 4/2011 | Kennon et al. | |
| 2003/0015351 A1 * | 1/2003 | Goldman et al. | 175/39 |
| 2005/0010382 A1 * | 1/2005 | Oliver et al. | 703/7 |
| 2006/0015310 A1 * | 1/2006 | Husen et al. | 703/10 |
| 2007/0276604 A1 * | 11/2007 | Williams et al. | 702/16 |
| 2008/0162098 A1 * | 7/2008 | Suarez-Rivera et al. | 703/10 |
| 2009/0012765 A1 * | 1/2009 | Raphael | 703/10 |
| 2009/0260880 A1 | 10/2009 | Thambynayagam et al. | |
| 2010/0032165 A1 * | 2/2010 | Bailey et al. | 166/369 |
| 2010/0299111 A1 * | 11/2010 | Dale et al. | 703/2 |
| 2011/0015907 A1 * | 1/2011 | Crawford et al. | 703/2 |
| 2011/0214878 A1 * | 9/2011 | Bailey et al. | 166/369 |

OTHER PUBLICATIONS

B.O. Pixler, "Formation Evaluation by Analysis of Hydrocarbon Ratios," Journal of Petroleum Technology, Jun. 1969, pp. 665-670.*

(Continued)

*Primary Examiner* — Omar Fernandez Rivas
*Assistant Examiner* — Herng-Der Day
(74) *Attorney, Agent, or Firm* — Haynes and Boone, LLP

(57) ABSTRACT

Methods and systems for optimizing wellbore completion and, in particular, methods and systems for optimizing hydraulic fracturing parameters are disclosed. In some embodiments, a method of optimizing wellbore completion includes gathering wellbore data, screening and processing the gathered wellbore data, utilizing the screened and processed wellbore data to define an optimized model, and utilizing the optimized model to evaluate combinations of available wellbore completion parameters. In some instances, the optimized model is defined using artificial neural networks, genetic algorithms, and/or boosted regression trees. Further, in some embodiments the combinations of available wellbore completion parameters include hydraulic fracturing parameters, such as number of fractures, fracturing fluid type, proppant type, fracturing volume, and/or other parameters.

26 Claims, 12 Drawing Sheets

(56) References Cited

OTHER PUBLICATIONS

Guo et al., "Using genetic algorithms to select inputs for neural networks", International Workshop on Combinations of Genetic Algorithms and Neural Networks, Jun. 1992, pp. 223-234.*

Wu et al., "Statistical Graphics and Visualization", http://www3.stat.sinica.edu.tw/stat2005w/download/Graphics&Visualization_Handout.pdf, 2006, 34 pages.*

Shelly, Bob, et al., "The use of artificial neural networks in completion stimulation and design," Computers & Geosciences 26 (2000) Sep. 9, 1999, pp. 941-951.

International Search Report and Written Opinion received in Patent Cooperation Treaty Application No. PCT/US12/53795, dated Sep. 5, 2012, 10 pages.

* cited by examiner

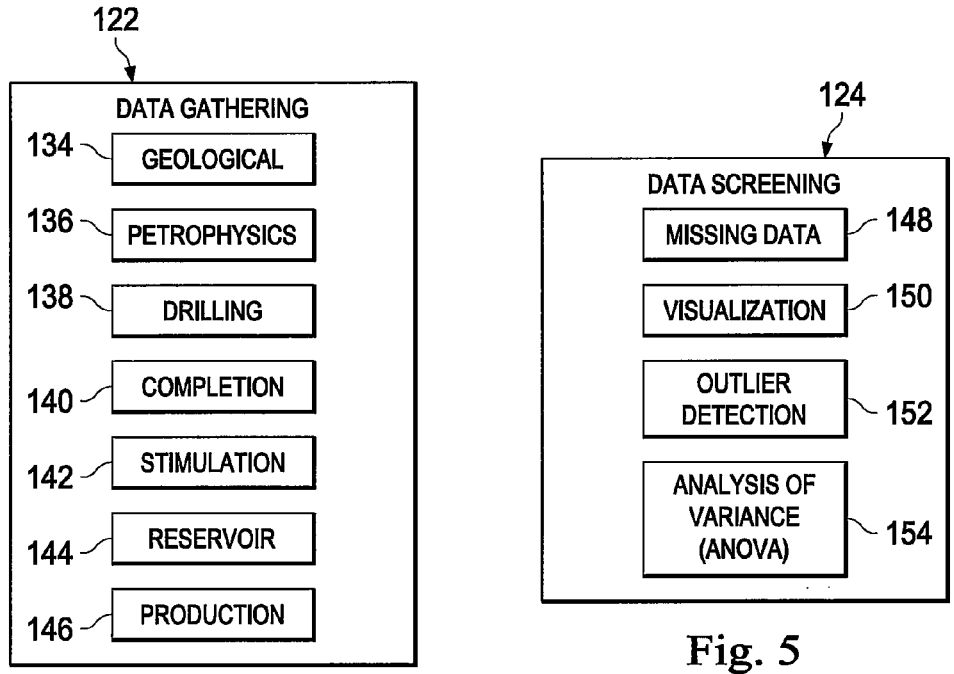
Fig. 4
Fig. 5
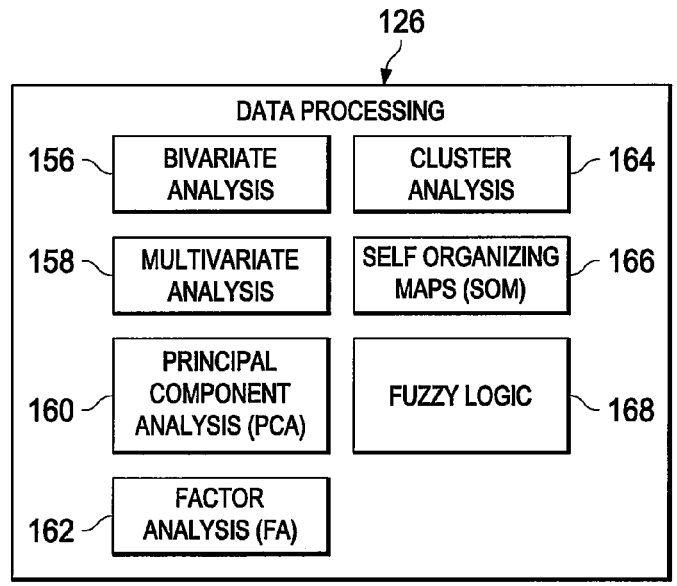
Fig. 6

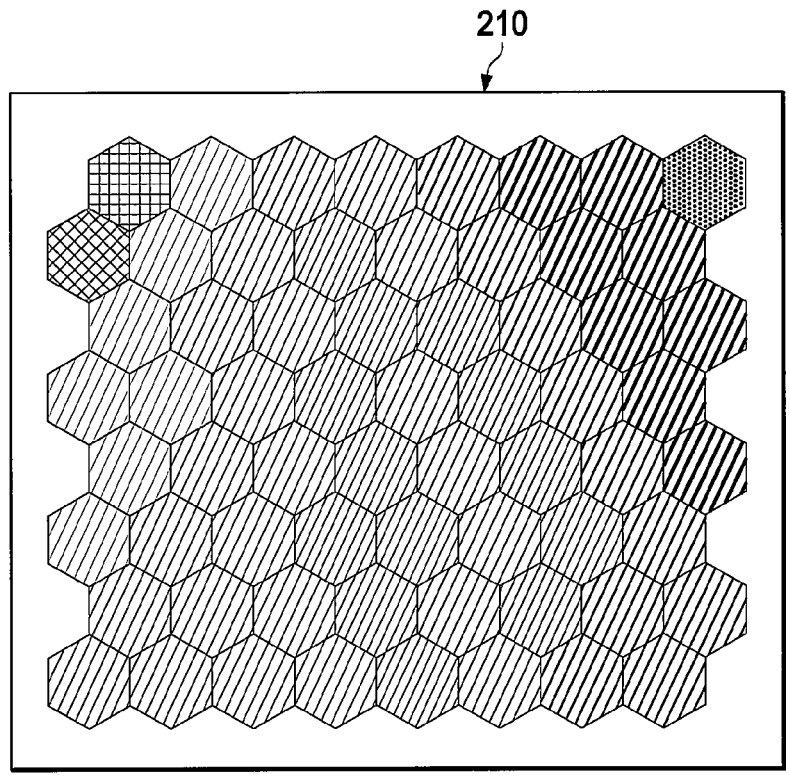
Fig. 10
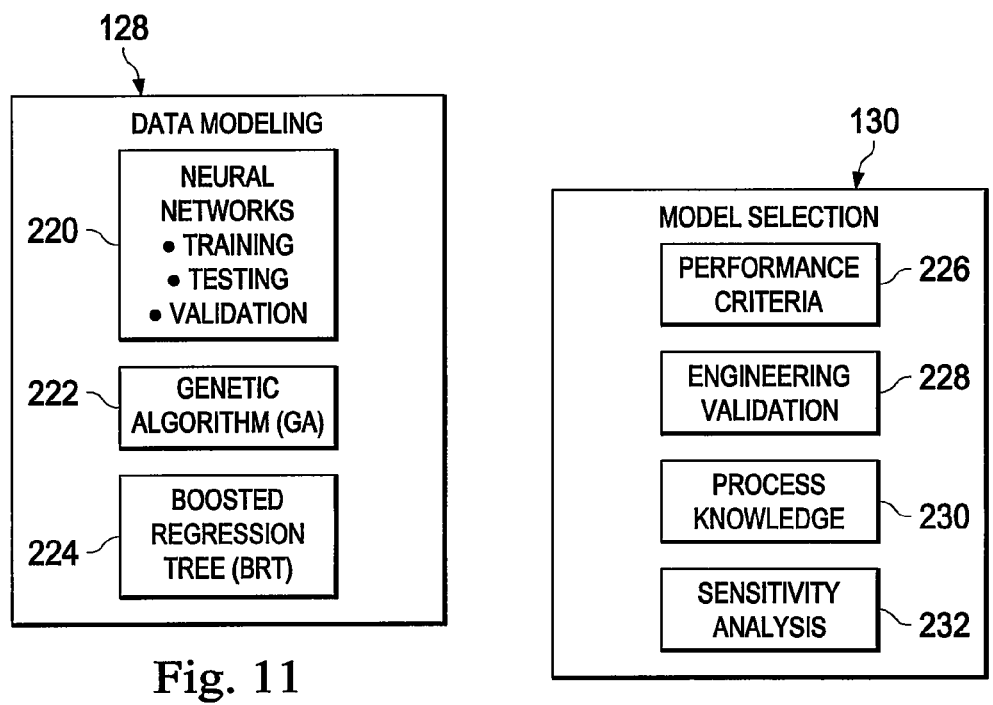
Fig. 11
Fig. 12

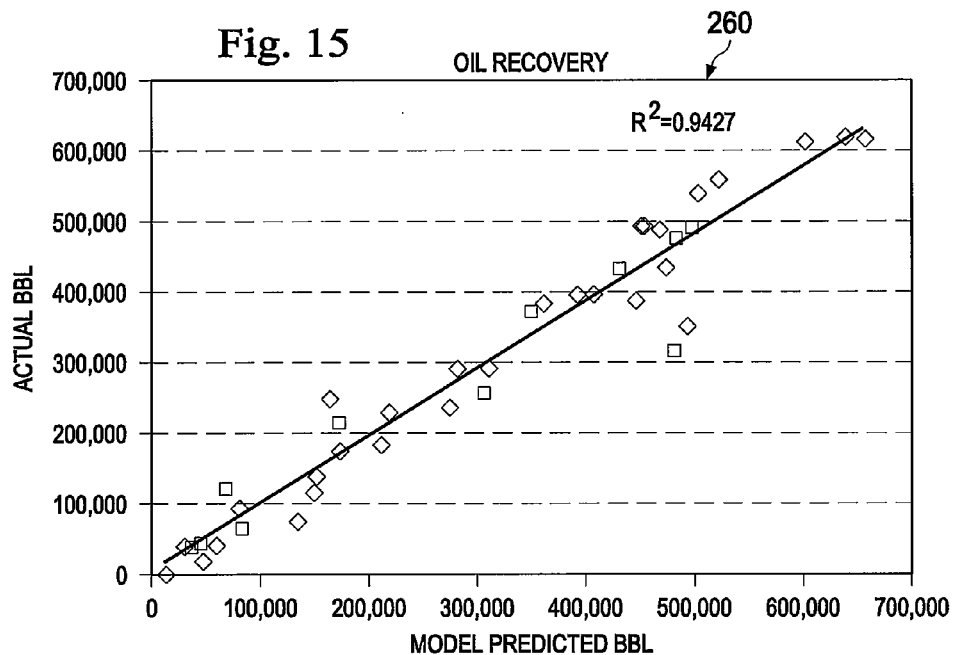

| PARAMETER | INFLUENCE ON PEAK OIL | INFLUENCE ON OIL RECOVERY | INFLUENCE OF (+10%) ON WATER |
|---|---|---|---|
| BUTANE | 24.12% | 17.70% | 7.10% |
| NUMBER OF FRACTURE TREATMENT | 14.45% | 13.25% | 21.31% |
| TOTAL GAS | 6.13% | 6.82% | -3.05% |
| PROPPANT | 3.86% | 5.22% | -2.97% |
| METHANE | -3.04% | -3.50% | 1.48% |
| STAGING METHOD AND PERFORATING | 3.92% | 1.73% | 4.29% |
| TREATMENT TYPE | 2.31% | 3.19% | 3.76% |
| LATERAL LENGTH | 3.15% | 1.05% | 10.76% |
| TREATMENT VOLUME | 2.49% | 2.03% | 2.56% |
| DRILLING MUD WEIGHT | 0.42% | 0.48% | -0.22% |

CONTROLLABLE COMPLETION AND FRAC PARAMETERS
NON-CONTROLLABLE RESERVOIR RELATED PARAMETERS

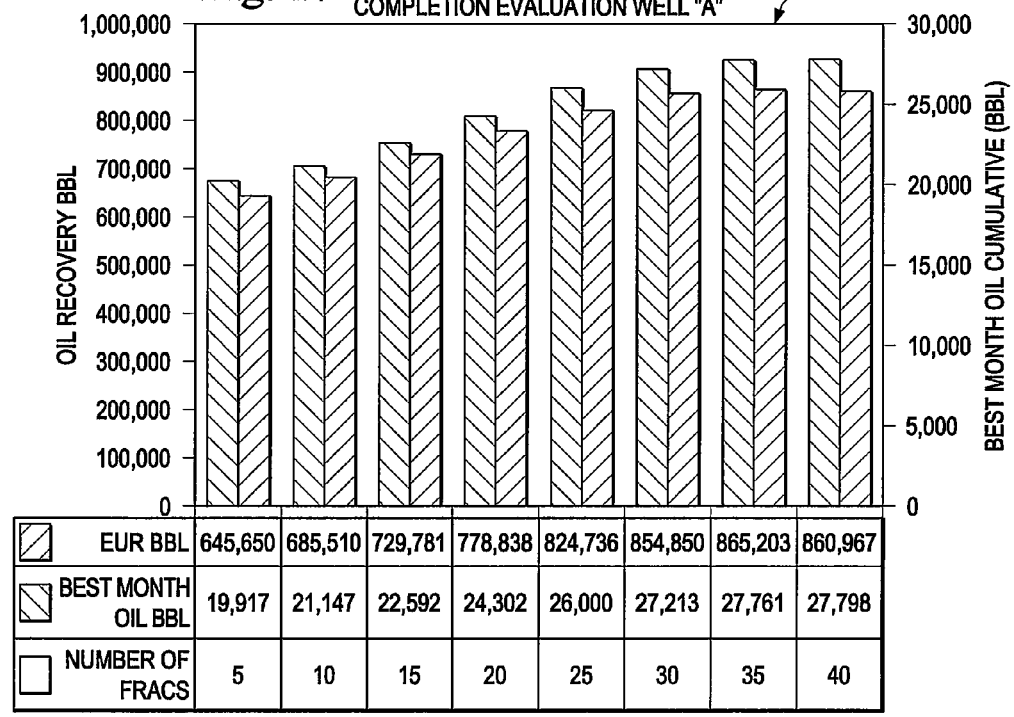
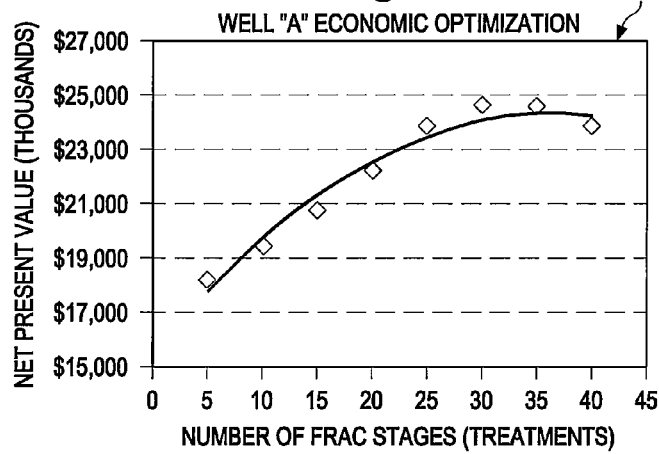

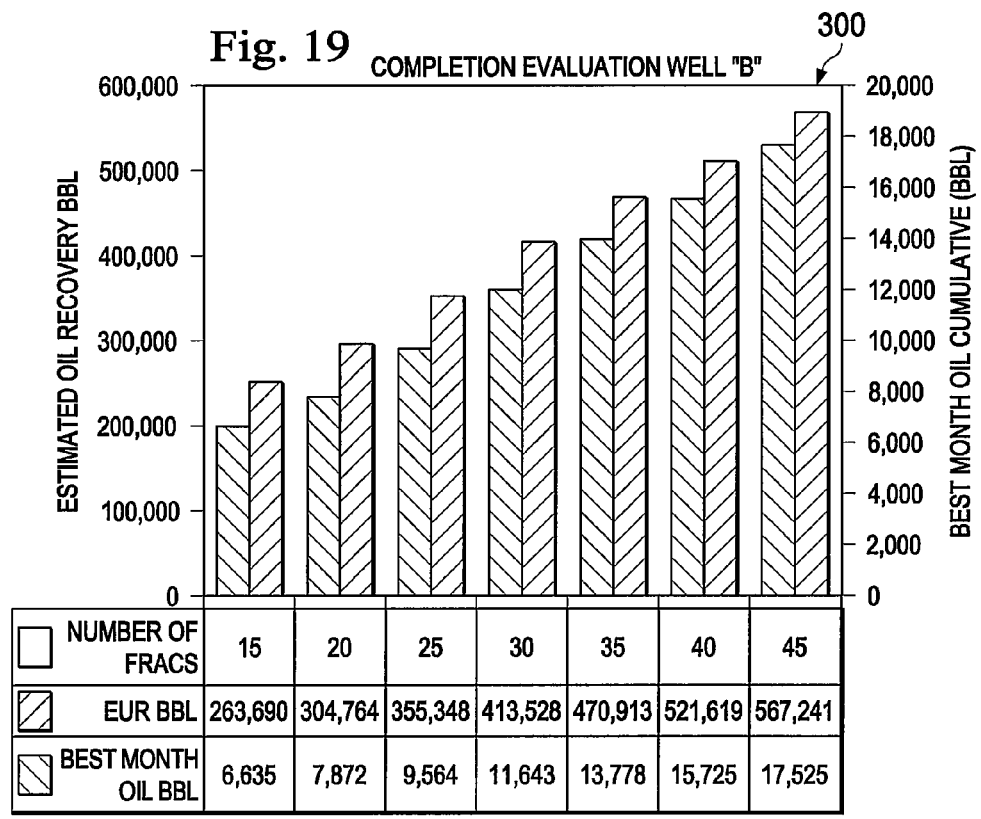
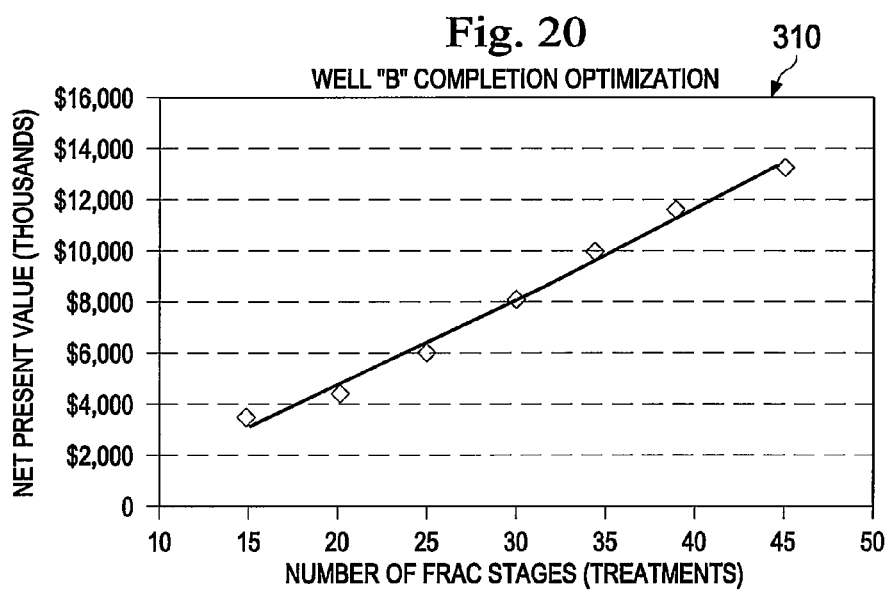

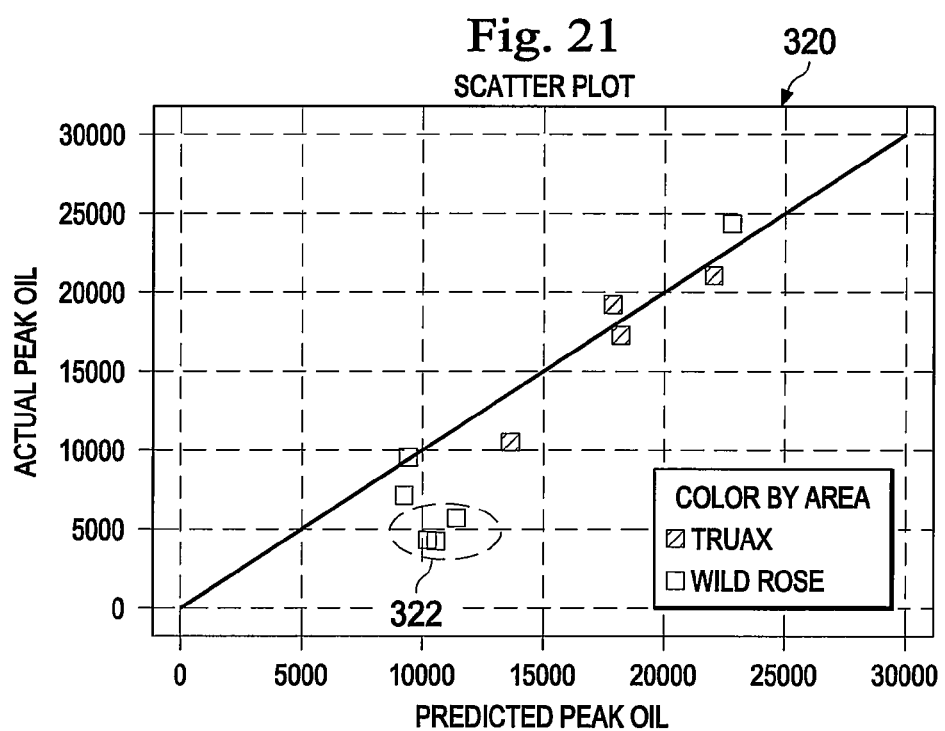

WELLBORE COMPLETION AND HYDRAULIC FRACTURING OPTIMIZATION METHODS AND ASSOCIATED SYSTEMS

TECHNICAL FIELD

The present disclosure relates to methods, devices, and systems associated with wellbores, including wellbores utilized to extract natural gas, oil, other hydrocarbons, and/or other natural resources. In some embodiments, the methods, devices, and systems of the present disclosure are utilized to optimize wellbore completions.

BACKGROUND

With the decline in hydrocarbon production from conventional resources, the focus has shifted toward producing hydrocarbons from unconventional resources. However, obtaining production from these unconventional resources is not as easy as obtaining production from conventional resources. Accordingly, the development of new technologies and methods is required to make obtaining production from unconventional resources financially feasible. Hydraulic fracturing technology has been developed to boost production from unconventional reservoirs by creating high permeability channels in the reservoir rock. This greatly improves the ability of fluids to flow toward the well and subsequently be transferred to the surface. However, the design parameters necessary for successful hydraulic fracturing are greatly affected by reservoir quality, completion scheme, wellbore properties, and other factors, many of which are not fully understood. This leads to only a few successful parameter combinations among numerous possible combinations. Considering the substantial costs associated with performing hydraulic fracturing and the critical need to enhance production, pinpointing the selection of parameters for an optimum hydraulic fracture design is crucial to having a profitable well. Clearly, it is not feasible or cost effective to field test every possible combination of fracturing parameters to find the best combinations for a particular well. Thus, more sophisticated methodologies are required to identify optimum hydraulic fracture design parameters.

Accordingly, there remains a need for improved methods, devices, and systems for optimizing wellbore completions.

BRIEF DESCRIPTION OF THE DRAWINGS

Illustrative embodiments of the present disclosure will be described with reference to the accompanying drawings, of which:

FIG. 4 is a diagram illustrating aspects of a data gathering step of the method illustrated in the flow chart of FIG. 3 according to an embodiment of the present disclosure.

FIG. 5 is a diagram illustrating aspects of a data screening step of the method illustrated in the flow chart of FIG. 3 according to an embodiment of the present disclosure.

FIG. 6 is a diagram illustrating aspects of a data processing step of the method illustrated in the flow chart of FIG. 3 according to an embodiment of the present disclosure.

FIG. 10 is a self-organizing map according to an embodiment of the present disclosure.

FIG. 11 is a diagram illustrating aspects of a data modeling step of the method illustrated in the flow chart of FIG. 3 according to an embodiment of the present disclosure.

FIG. 12 is a diagram illustrating aspects of a model selection step of the method illustrated in the flow chart of FIG. 3 according to an embodiment of the present disclosure.

FIG. 15 is a graph illustrating estimated well production based on a predictive model according to an embodiment of the present disclosure.

FIG. 16 is a chart illustrating correlation values of various well completion and reservoir parameters to well production according to an embodiment of the present disclosure.

FIG. 17 is a graph illustrating well production values for a well relative to a plurality of well completion options for the well according to an embodiment of the present disclosure.

FIG. 18 is a graph illustrating economic value of a well relative to a plurality of well completion options for the well according to an embodiment of the present disclosure.

FIG. 19 is a graph illustrating well production values for a well relative to a plurality of well completion options for the well according to another embodiment of the present disclosure.

FIG. 20 is a graph illustrating economic value of a well relative to a plurality of well completion options for the well according to another embodiment of the present disclosure.

FIG. 21 is a graph illustrating actual oil recovery from a well relative to a predicted oil recovery based on a predictive model according to an embodiment of the present disclosure.

DETAILED DESCRIPTION

Figure 1:
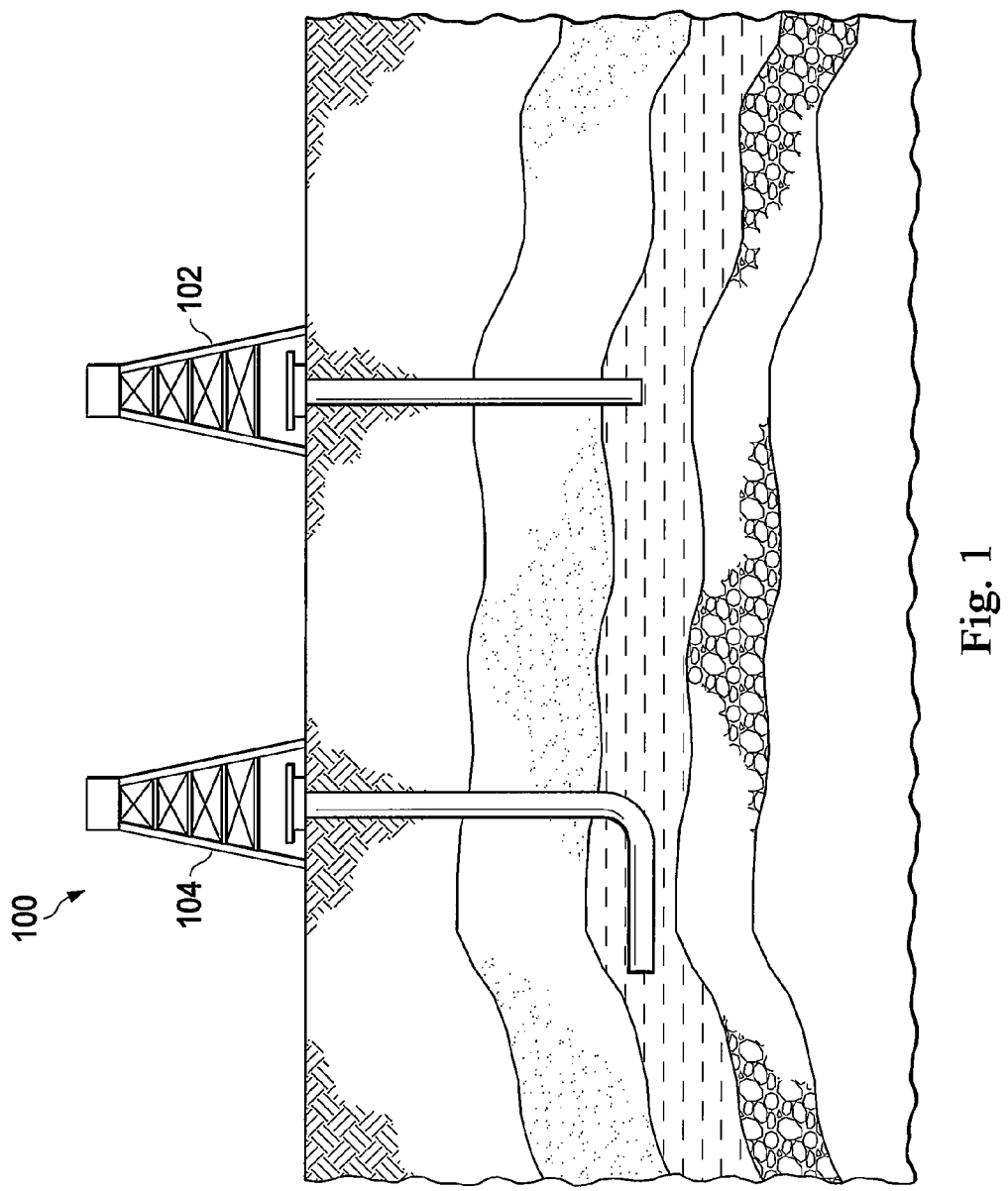
FIG. 1 is a diagrammatic, partial cross-sectional side view of a field having a vertical well and a horizontal well in accordance with aspects of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described methods, devices, and systems, and any further application of the principles of the present disclosure are fully contemplated and included within the present disclosure as would normally occur to one skilled in the art to which the disclosure relates. In particular, it is fully contemplated that the steps, features, and/or components described with respect to one embodiment may be combined with the steps, features, and/or components described with respect to other embodiments of the present disclosure. For the sake of brevity, however, the numerous iterations of these combinations will not be described separately.

Referring initially to FIG. 1, shown therein is a field 100 having a vertical well 102 and a horizontal well 104. Generally, the field 100 is representative of any type of field where natural resources are obtained. In some particular instances, the field 100 is an oil field, natural gas field, and/or other hydrocarbon field. Due to the current state of drilling, the following description will primarily focus on the optimization of horizontal well completions. However, it is understood that the concepts described herein are equally applicable to vertical wells. To that end, the field and reservoir parameters associated with horizontal wells have identical and/or analogous parameters that are associated with vertical wells. Likewise, the various well completion parameters discussed herein for horizontal wells also have identical and/or analogous parameters for vertical wells. Accordingly, one of ordinary skill in the art will readily see how the specific examples provided below for horizontal well completions can be used to optimize vertical well completions as well.

Figure 2:
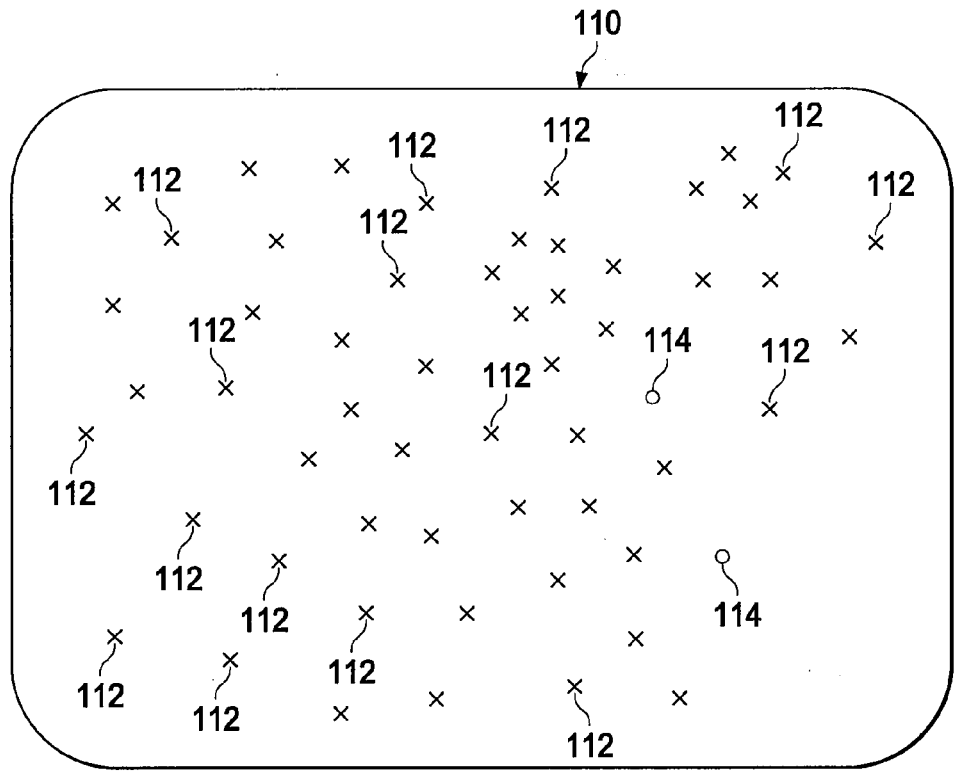
FIG. 2 is a diagrammatic top view of a field having a plurality of completed and uncompleted wells in accordance with aspects of the present disclosure.

Referring now to FIG. 2, shown therein is a map of a field 110 according to an embodiment of the present disclosure. In this regard, the map 110 shows the location of a plurality of completed wells 112 (each marked with an "x", some numeric labels have been omitted for clarity) and the location of uncompleted wells 114 (each marked with an "o"). As will be discussed below, in some instances data regarding the completed wells 112 is utilized to generate one or more predictive models. At least one of the predictive models is subsequently utilized to estimate well production for the uncompleted wells 114. More specifically, in some instances a predictive model identified as the "best" predictive model for the field is utilized to estimate well production for a plurality of different completion parameters in order to identify a combination of completion parameters that optimizes well production. As will be discussed below, evaluation of the predictive models to identify the "best" predictive model for a particular field can take numerous factors into consideration. Further, in some instances more than one "best" predictive model may be identified for a particular field. In such instances, the results from each of the "best" predictive models may be taken into consideration in identifying the optimized well completion parameters. Generally, the larger the number of completed wells 112 utilized to generate the predictive model, the more accurate the model will be. However, the methods and systems of the present disclosure are suitable for use with large or small data sets (e.g., ten or fewer wells for a field).

Figure 3:
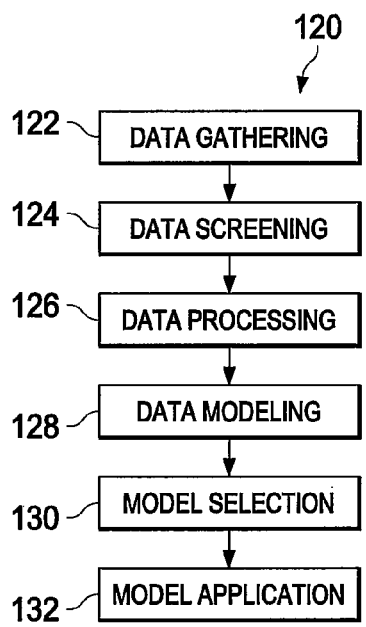
FIG. 3 is a diagrammatic flow chart of a method of optimizing well completion according to an embodiment of the present disclosure.

Referring now to FIG. 3, shown therein is a flowchart of an exemplary method 120 of optimizing wellbore completion according to an embodiment of the present disclosure. In this regard, the method 120 will be described with respect to various steps or stages below. This is simply to provide clarity to the concepts of the method 120 and does not require a particular order or separation of the steps/stages. Rather, it is understood that aspects of the various steps and/or stages described below with respect to any of the embodiments of the present disclosure may be combined into a single step/stage from multiple steps/stages, separated into multiple steps/stages from a single step/stage, reordered, and/or combinations thereof. Further, it is noted that many of the steps/stages described below have numerous optional components of which one or all may be performed in any particular implementation. Accordingly, for the sake of brevity the numerous iterations of these different combinations will not be described herein. Rather, it is understood that, unless otherwise noted, any combination of components (from any one component, to any two components, to any three components, . . . , to all of the components) for each step/stage may be combined with any combination of components (from any one component, to any two components, to any three components, . . . , to all of the components) from the other steps/stages.

Generally, the methods and systems described herein aim to optimize hydraulic fracture and wellbore completion designs through the use of data typically obtained during well drilling and/or operation (e.g., mud logs) and artificial intelligence (AI) without the need for well-specific wireline or open hole logging data. The process includes multiple stages including data gathering, screening, processing, modeling, and forecasting. The data used is comprised of data such as drilling, completion, fracturing, seismic, and production data such that separate logging is not necessary. In that regard, mud logs are a major component of some implementations of the process because they are often readily available and carry reservoir quality properties that can be correlated to completion and fracture designs. While specific logging data is not required, when such data is available it can be utilized to further enhance the effectiveness of the predictive models of the present disclosure. In this regard, Artificial Neural Networks (ANN) and Genetic Algorithms (GA) are used for data modeling and finding hidden patterns within the large volumes of data. Forecasting is done with trained and cross-validated neural network models. Further detailed analysis (e.g., sensitivity analysis) is performed subsequently in some instances. The final outcome of the methods and systems described herein enable the optimization of fracture designs for a well with respect to the cost of completing the well and the resulting hydrocarbon production. In this regard, the present disclosure provides techniques that lead to both cost savings and increased hydrocarbon production.

The term "artificial intelligence" as used herein refers to a collection of methods aimed at solving complex problems using cognitive processes of biological systems. In this regard, neural networks are the most commonly used artificial intelligence method. Neural networks have numerous advantages such as the ability to find nonlinear patterns, handle missing data, and handle large number of unknowns (e.g., outputs). But to be most effective neural networks require a sufficient amount of data to train the networks (i.e., learn and understand the complexity of the given datasets). This requires rigorous attempts of data gathering, screening, and pre-processing. Accordingly, as shown in FIG. 3, the method begins at step 122 with data gathering. Data related to the wells of a particular field/reservoir, both completed and uncompleted, are gathered from all the readily available sources. The initial data gathering step 122 is intended to capture all data that may be useful in evaluating the completed wells that can be used to predict or estimate the impact of various completion design parameters for a particular uncompleted well. The data can come from a wide variety of information sources, such as drilling, geology, completion, stimulation, and production. In some implementations of the present disclosure the well completion optimization is primarily and/or entirely based on mud log data. Mud logs are typically available and contain rock properties suitable for use in predictive modeling in accordance with embodiments of the present disclosure.

Data gathering is an important part of the method 120 as many of the subsequent steps and analysis depend upon the data gathered in step 122. To this end, data is extracted from all available sources in some instances. Referring now to FIG. 4, examples of the various types of data that are commonly utilized will be described, however, no limitation is intended thereby. Rather, it is understood that the methods and systems of the present disclosure can utilize essentially any type of information related to a field/reservoir and/or wells thereof that can be quantified in some manner. Accordingly, one of ordinary skill in the art will recognize that extension of the methods and systems of the present disclosure to types of data not explicitly described within the present disclosure is still within the scope of the present disclosure. Further, it is understood that the data may come in various types of file formats, including databases, spreadsheets, .pdf files, text files, ASCII files (e.g., LAS files designed for well logs), xml files, SGY files (e.g., special ASCII files designed for seismic data), and/or combinations thereof. In this regard, it is also understood that the file formats include both common file formats and proprietary file formats. Generally, data obtained from any type of format may be utilized within the methods and systems of the present disclosure. Those of ordinary skill in the art will recognize that some file conversion and/or other processes are implemented in some instances to allow for the proper processing of the data from the various file formats within the context of the present disclosure. Accordingly, the details of such conversions and processing will not be described in detail herein.

In some instances, the data gathering step 122 includes gathering or obtaining geological information 134, such as estimated fracture geometry using micro-seismic and tiltmeter measurements, seismic data, and/or other geological information. In some instances, saturation, structure, and/or other rock properties are correlated to the geological information 134. In some instances, the geological information 134 is derived from a plurality of data sources having various file formats. In some instances, the geological information 134 is in SGY format (i.e., an ASCII file format designed for seismic data). In other instances, the geological information 134 is in other file formats.

In some instances, the data gathering step 122 includes gathering or obtaining petrophysics information 136, such as gamma ray, caliper, resistivity, neutron, density, sonic, magnetic resonance imaging and detailed lithology logs, and/or other petrophysics information. In some instances, the petrophysics information 136 is obtained from open hole wireline logs. In that regard, the logs are typically measured relative to a depth of the well. In some instances, reservoir, rock, and/or fluid properties are correlated to the petrophysics information 136. In some instances, the petrophysics information 136 is derived from a plurality of data sources having various file formats. In some instances, the petrophysics information 136 is in ASCII (LAS files designed for well logs). In other instances, the petrophysics information 136 is in other file formats.

In some instances, the data gathering step 122 includes gathering or obtaining drilling information 138, such as rate of penetration, average mud weight, total gas, bottomhole temperature, vertical depth, azimuth and well inclination (for slanted and horizontal wells), lateral orientation (for horizontal wells), and/or other information regarding drilling. In some instances, wellbore properties and some reservoir rocks can be correlated to the drilling information 138. In some instances, the drilling information 138 is obtained from mud logs, which may include data such as total gas, penetration rates, chemo-stratigraphy, gas chromatograph measurements of alkanes having one or more carbon atoms versus depth (i.e., alkanes having 1, 2, 3, 4, 5, 6, 7, 8, 9, 10, or more carbon atoms), and/or other mud log information. Mud log data is typically obtained during drilling of a well and, therefore, is commonly available. Accordingly, in some implementations of the present disclosure mud lug data is the primary source of information utilized for deriving predictive models and optimizing well completion. In particular, in some instances, the gas ratios (e.g., between the various combinations of $C_1$, $C_2$, $C_3$, $C_4$, and $C_5$ ratios, including ratios of $C_1/C_2$ (methane/ethane), $C_1/C_3$ (methane/propane), $C_1/C_4$ (methane/butane) and $C_1/C_5$ (methane/pentane)) are utilized as a primary factor in both deriving the predictive models and evaluating the predictive models to identify a "best" predictive model. Some exemplary gas ratio evaluations will be discussed below in the context of FIG. 14. Data from drilling information 138, including mud logs, is used for selection of an optimized pay zone in some instances, which can, in turn, be used to select appropriate completion design parameters in accordance with the present disclosure. In some instances, the drilling information 138, including mud logs, is derived from a plurality of data sources having various file formats. In some instances, the drilling information 138 is in Microsoft Excel spreadsheet format, ASCII format (LAS files designed for well logs), .pdf format, .hlg format, .mlg format, .hl6 format, and/or other standard or customized formats. In other instances, the drilling information 138 is in other file formats.

In some instances, the data gathering step 122 includes gathering or obtaining completion information 140, such as perforation clusters, phasing, perforation interval depth and thickness, cluster per fracture stages, tubing size, completion time/date, and/or other information regarding completion. In some instances, hydrocarbon production is correlated to the completion information 140. In some instances, the completion information is derived from a plurality of data sources having various file formats. In some instances, the completion information 140 is in Microsoft Excel spreadsheet format and/or .pdf format. In other instances, the completion information 140 is in other file formats.

In some instances, the data gathering step 122 includes gathering or obtaining stimulation information 142, such as treatment volumes and rates, fluid types, proppant size and mass, acid volume, fracture stages, initial and final instantaneous shut-in pressure (ISIP), breakdown pressure, pressure trend, closure pressure, conductivity, fracture gradient, and/or other information regarding stimulation. In this regard, the stimulation design parameters from completed wells are defined and described by the stimulation information 142. Accordingly, in some instances the stimulation information 142 is utilized in a predictive model to estimate the effects of various stimulation options (e.g., hydraulic fracturing parameters) on well production. In this regard, well production is correlated to stimulation parameters from the stimulation information in some instances. In some instances, the stimulation information 142 is in Microsoft Excel spreadsheet format and/or .pdf format. In other instances, the stimulation information 142 is in other file formats.

In some instances, the data gathering step 122 includes gathering or obtaining well, field, and/or reservoir information 144, such as lease and API names, surface coordinates, Kelly bushing elevation, surface elevation, different types of maps (geology map, isocore thickness, isopach, etc.), target depth, pay zone thickness, pay top depth, porosity, permeability, saturation, pore pressure, total organic carbon (TOC) measurements, and/or other information regarding the well, field, and/or reservoir. In some instances, rock and/or fluid properties can be correlated to the well, field, and/or reservoir information. In some instances, the well, field, and/or reservoir information is derived from a plurality of data sources having various file formats. In some instances, the well, field, and/or reservoir information is in Microsoft Excel spreadsheet format. In other instances, the well, field, and/or reservoir information is in other file formats.

In some instances, the data gathering step 122 includes gathering or obtaining production information 146, such as oil, water, and gas production rates, cumulative productions, water cut, production decline parameters, estimated ultimate recovery, and/or other information regarding production. In this regard, production rates are a result of the response of the reservoir to the drilling, completion, and stimulation designs. Accordingly, production information 146 facilitates the evaluation of the effectiveness of various parameters associated with well completion, including any hydraulic fracturing design parameters. To that end, in some instances one or more of the outputs of the predictive models of the present disclosure include estimated production values, such as total production, peak production, average production, and/or other production parameters over a set amount of time (e.g., per day, per week, per month, per quarter, per year, or otherwise). In some instances, the production information 146 is derived from a plurality of data sources having various file formats. In some instances, the production information 146 is in Microsoft Excel spreadsheet format. In other instances, the production information 146 is in other file formats.

In some instances, as part of the data gathering step the data is filtered, reformatted, and/or pre-processed to be in useable form for subsequent steps of the method 120. For example, many data types, such as well logs and digital mud logs, provide high frequency detailed measurements that cannot be easily used in the data modeling directly. Therefore, in some instances representative values of such data types are found for the entire fractured region. In some implementations, this is done by analyzing the wellbore directional survey, extracting perforation schemes and locating the hydraulic fracture intervals. Once the fracture intervals are identified, average representative values of well logs and digital mud logs are calculated. Production data is modified or calibrated to a common scale and/or reference point in some instances to accommodate for differences in production period and/or measurement noise, which are common issues with the raw production data. In this regard, in some instances cumulative data is preferred over the production rates because the magnitude of noise is reduced. In some instances, a constant time window is selected to handle differences in days on production, which can be dependent on the maturity of the field (e.g., a six-month interval is utilized in some instances for more mature wells/fields, while a thirty-day-interval is utilized in some instances for newer fields).

The outcome of the data gathering process is a dataset that includes a list of wells with their respective attributes (data types). Often the dataset includes data from multiple wells with more than 50 attributes for each well. There is no minimum number of wells or attributes, but the larger the number of wells and attributes the more accurate the resulting predictive model(s) will be.

Referring again to FIG. 3, with the data gathered at step 122, the method 120 continues at step 124 with data screening. In this regard, in some instances all of the data discussed above is typically not available. Often, only portions of the data discussed above are available and typically the same data may not be available for all wells. Accordingly, the data screening step 124 serves to manipulate the available data to make the best use of the available data. Referring now to FIG. 5, examples of the types of data screening utilized in the context of the present disclosure will be described, however, no limitation is intended thereby. Rather, it is understood that the methods and systems of the present disclosure can utilize essentially any type of data screening and/or filtering, especially those suitable for addressing incomplete and/or inaccurate datasets. Accordingly, one of ordinary skill in the art will recognize that extension of the methods and systems of the present disclosure to types of data screening and/or filtering not explicitly described within the present disclosure is still within the scope of the present disclosure.

As noted, the data gathered in step 122 is typically raw data that needs to be examined and manipulated for consistency before proceeding to the data modeling stage. In this regard, the dataset often includes both bad data and missing data that must be addressed. As shown, in some instances, the data screening 124 includes a step 148 for addressing missing data. In this regard, there are generally three main approaches for addressing missing data. First, wells with missing attributes can be deleted entirely. This option is best suited for datasets with a large number of wells such that the deletion of a single well does not significantly affect the overall dataset. Further, a well having many missing data entries compared to other wells in the dataset is particularly suitable for deletion or removal. A second option is to set to the missing data field to a constant value. Rather than deleting the entire dataset for a well, a missing data entry can be set to a constant value. The specific value can be selected based on the type of data entry that is missing. In some instances, the same value is used for all wells in the dataset missing that type of data entry. However, in other instances the value of a specific missing data entry may be estimated by making calculations based on other known and present data entries. Finally, a third option is to set the missing data field to the average value for the dataset. In this regard, by setting the missing data field to the average value for the dataset, the average value(s) for the dataset are not skewed by a few or a large number of wells having missing data entries. However, such an approach changes the descriptive statistics of the attribute (e.g., mean and variance). In some instances, the average value for the dataset is used for all wells in the dataset missing that type of data entry.

In some instances, data screening 124 also includes data visualization 150 and/or outlier detection 152, in which various attributes are plotted against each other to find patterns, relationships, and/or outliers. In this regard, data visualization can often provide a qualitative understanding of the behavior of the data to a user. Further, data outliers can greatly and adversely affect the learning process in the subsequent data modeling stage and may confuse a neural network attempting to adapt to such outliers. Therefore, in some instances outliers are removed from the dataset. In this regard, in some instances the data visualization 150 facilitates identification of data outliers, which may be tagged for removal and/or modification by a user manually and/or automatically by the computer system in response to instructions stored in a non-transitory computer readable medium executed by the computer system. In this regard, when an outlier is detected, approaches similar to those discussed above for missing data can be utilized. In particular, the well with the outlier data can be deleted from the dataset entirely, the well with the outlier data can be ignored with respect to the outlier data field, the outlier data can be set to a constant value, or the outlier data can be set to the average value for the dataset.

Figure 7:
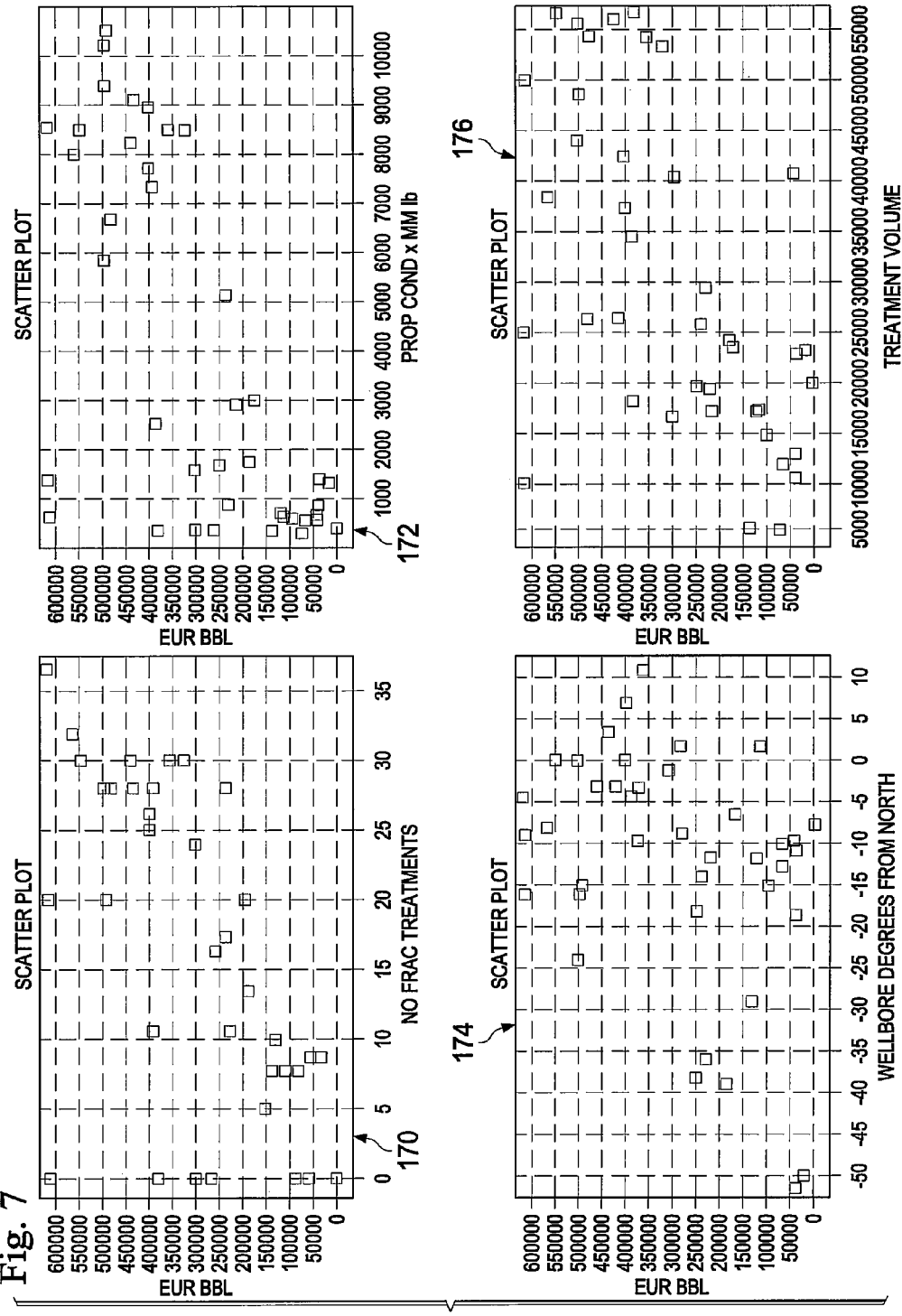
FIG. 7 is a collection of scatter plots associated with a bivariate analysis according to an embodiment of the present disclosure.

Data visualization 150 can be done in many different ways, including through the use of various types of charts, graphs, and/or other visual representations. In some instances, the types of data visualization utilized are particularly suited to identifying correlations between parameters and/or outliers. In some instances, similar data types across multiple wells are compared and/or plotted together. For example, as shown in FIG. 7, comparing various completion data parameters may identify possible outliers. In this regard, FIG. 7 shows four scatter plots 170, 172, 174, and 176 that show various completion parameters for wells of a field relative to the production of those wells. In particular, scatter plot 170 plots production output relative to the number of fracturing treatments, scatter plot 172 plots production output relative to average proppant conductivity, scatter plot 174 plots production output relative to wellbore location (measured in degrees from North), and scatter plot 176 plots production output relative to treatment volume. In some instances, software suites such as Microsoft Excel and TIBCO Spotfire are implemented to create such scatter plots.

Figure 8:
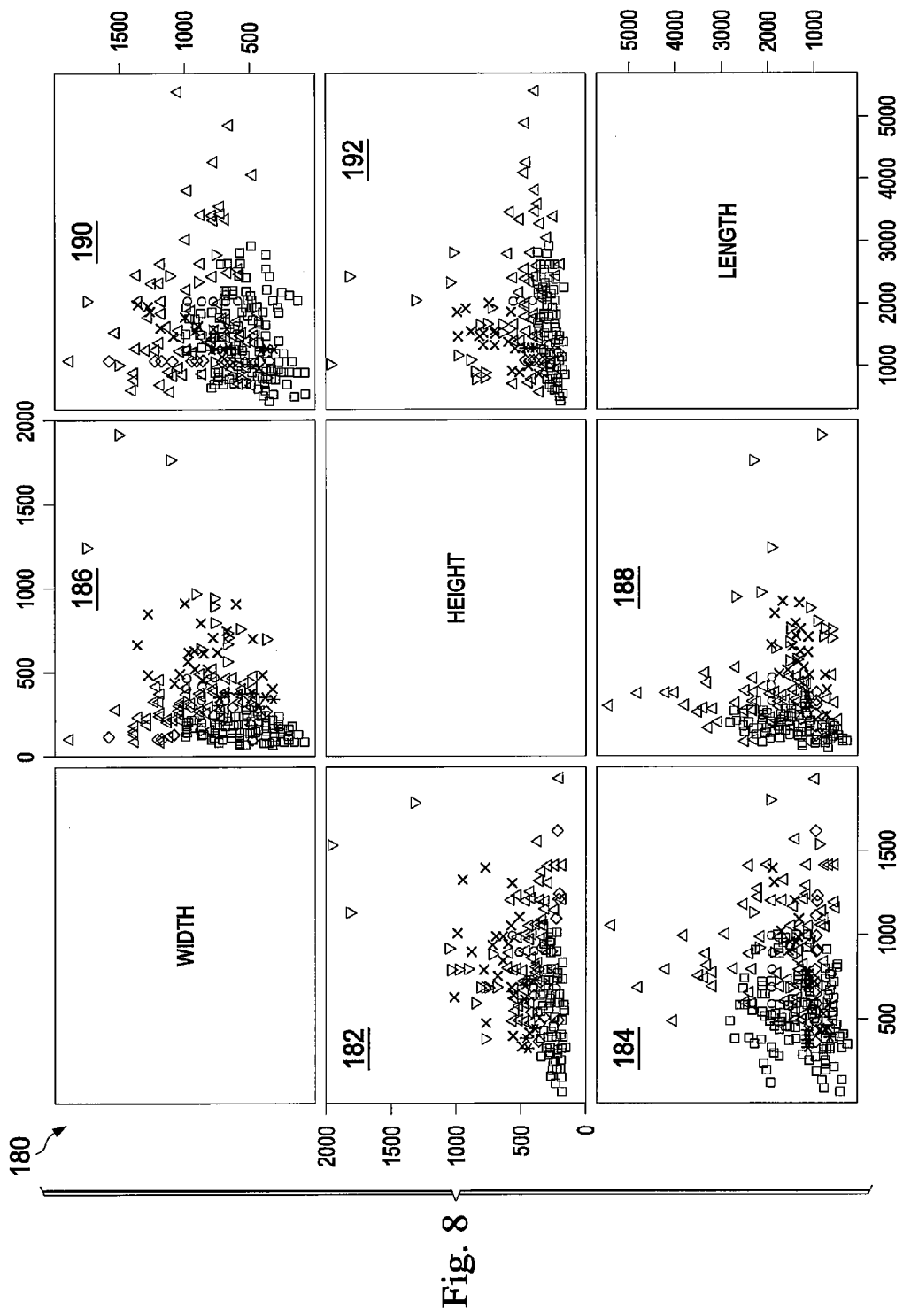
FIG. 8 is a scatter plot matrix according to an embodiment of the present disclosure.

Scanning through an entire large dataset with bivariate comparisons can be inefficient for identifying outliers and/or recognizing correlations in some implementations. Accordingly, in some instances a scatterplot matrix is utilized. In this regard, scatterplot matrices are particularly suited for visually representing multidimensional data. For a p-variate dataset, a scatterplot matrix is the ordered display of p(p−1) scatterplots. An inherent advantage of a scatterplot matrix over simple bivariate analysis is the ability to visualize large amounts of data across multiple plots and scan to find relationships and outliers. In this regard, FIG. 8 illustrates an exemplary scatterplot matrix 180 having three variables, namely width, height, and length. As shown, the scatterplot matrix 180 includes six different scatter plots 182, 184, 186, 188, 190, and 192. In this regard, scatter plot 182 charts height relative to width, scatter plot 184 charts length relative to width, scatter plot 186 charts width relative to height, scatter plot 188 charts length relative to height, scatter plot 190 charts width relative to length, and scatter plot 192 charts height relative to length. Based on the scatter plot matrix 180, a user and/or a computer system (using image processing programs) can identify outliers and/or potential parameter correlations that can be taken into consideration.

In some instances data screening 124 includes Analysis of Variance (ANOVA) 154 in addition to or in lieu of data visualization to identify outliers and/or parameter correlations. In this regard, ANOVA utilizes a statistical test of the mean and covariance of the data to reveal data points far from the mean (i.e., outliers). In this regard, squared robust Mahalanobis distances of the data are used in some instances to calculate the distances within the data. To find outliers with ANOVA, each data type is compared individually because feeding all data types in one step is not feasible. For example, completion parameters across multiple wells are compared together using the ANOVA technique. In that regard, categorical comparisons of data across wells are utilized in some instances. In some instances, the statistical analyses (including ANOVA) of the present disclosure are carried out using the open source R-programming language.

Referring again to FIG. 3, with the data screening step 124 completed, the method 120 continues to step 126 where the data is further processed. In this regard, while the data screening step 124 results in a dataset where missing data and outliers have been addressed, the resulting dataset is difficult to analyze because of high dimensionality (i.e., large number of data parameters). The so-called curse of dimensionality problem arises from the analysis of high dimensional data and inability to describe and extract meaningful information from such data. Therefore, in some instances the number of attributes is reduced and the most important attributes are extracted for further analysis and modeling. In this regard, FIG. 6 shows examples of the types of data processing utilized in the context of the present disclosure to identify the most important data parameters, however, no limitation is intended thereby. Rather, it is understood that the methods and systems of the present disclosure can utilize essentially any type of data processing and/or filtering, especially those suitable for identifying correlations between data parameters. Accordingly, one of ordinary skill in the art will recognize that extension of the methods and systems of the present disclosure to types of data processing and/or filtering not explicitly described within the present disclosure is within the scope of the present disclosure.

As shown in FIG. 6, the data processing step 126 can use one or more of bivariate analysis 156, multi-variate analysis 158, principal component analysis (PCA) 160, factor analysis (FA) 162, cluster analysis 164, self-organizing maps (SOM) 166, and/or fuzzy logic 168. In this regard, principal component analysis 160 and factor analysis 162 are generally understood to be types of multi-variate analysis 158, while self-organizing maps 166 and fuzzy logic 168 are understood to be types of cluster analysis 164. Accordingly, in order to address the curse of dimensionality bivariate analysis, multivariate analysis (e.g., principal component analysis, factor analysis, etc.), cluster analysis (e.g., self-organizing maps, fuzzy logic, support vector machine, and dendrograms), and/or combinations thereof are utilized. In some particular embodiments, a combination of multivariate analysis and cluster analysis is utilized.

Multivariate analysis is a step of data processing in which multivariate statistics of the data are studied in order to extract relationships involving more than two data parameters. Principal component analysis 160 is a technique for reducing the number of variables in the dataset. Principal component analysis 160 seeks to find linear relationships within the data and, by identifying and selecting only those variables with distinct correlations, the number of variables will be reduced. To this end, principal component analysis 160 uses orthogonal transformation of the data to convert variables to the linearly uncorrelated variables. Different data types are analyzed using principal component analysis 160 and, with the help of bi-plots (i.e., visualization plot of the principal components) in some instances, variables with very high correlations are identified. For example, where the correlation scale ranges from −1 to 1, with a correlation of 1 meaning the variables have a perfect, direct correlation and a correlation of −1 means the variables have perfect, inverse correlation (e.g., if one increases the other decreases), then a high correlation is considered, in some instances, to be a correlation between 0.75 and 1.0 and/or between −0.75 and −1.0. By selecting those variables with high correlation, a set of variables with distinct linear correlations is produced.

In conjunction with and/or separate from principal component analysis 160, factor analysis 162 is used for reducing the number of variables. Factor analysis 162 is a statistical method used to describe the variability of the data with a potentially lower number of unobserved variables called factors. Then, correlations of each factor with respect to all variables are identified. Ranking variables with the highest correlation coefficients (e.g., ±0.5 cut off is utilized in some instances, while in other instances a ±0.75 cut off is used) reveals the cluster of variables. Further, using parallel analysis (study of eigenvalues of the dataset) sheds light on the minimum number of factors necessary to describe the variability of the data. In some instances, principal component analysis and factor analysis are both necessary for reduction of the variables in the dataset. Further still, in some instances engineering judgment, which may be manually input by a user and/or programmed into the system, and process knowledge are utilized in some instances to further reduce the number of variables. For example, engineering judgment and/or process knowledge are utilized in some instances to eliminate variables that may show a high correlation in the dataset, but are known to have little actual impact on production and/or include variables that may show a relatively low correlation in the dataset, but are known to have impact on production. In this regard, in some instances particular variables can tagged to always be included, to always be excluded, and/or to only be included when correlation to one or more other parameters meets a requisite threshold.

Figure 9:
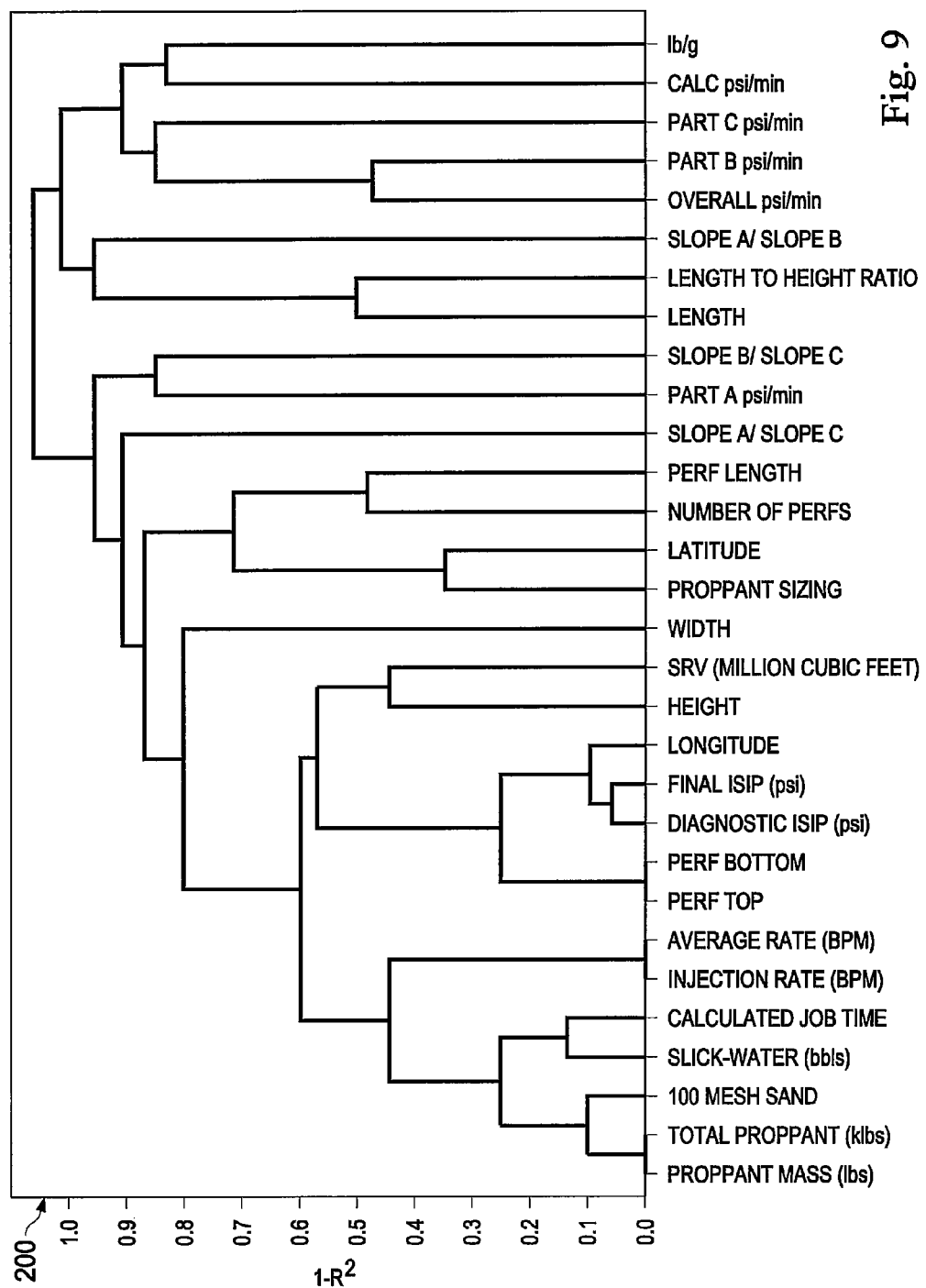
FIG. 9 is a dendrogram according to an embodiment of the present disclosure.

In conjunction with and/or separate from the multivariate analysis 158, including principal component analysis 160 and factor analysis 162, cluster analysis 164 is used for reducing the number of variables. In this regard, although multivariate analysis techniques are a great collection of tools to examine the data, they are generally weak in identifying non-linear patterns and relationships. Therefore, more sophisticated non-linear pattern recognitions are desired. To this end, cluster analysis 164 can be utilized to identify these more sophisticated non-linear patterns. One example of such a cluster analysis 164 is a visualization method called a dendrogram, which is a tree diagram representing hierarchical clustering of the data. FIG. 9 shows an example of a dendrogram 200 for an exemplary dataset according to an embodiment of the present disclosure. In this regard, the results of the cluster analysis for the dataset are illustrated by the dendrogram 200. More specifically, the dendrogram 200 lists the variables and indicates at what level of similarity any two clusters were joined. The relative stem length of a tree in a dendrogram represents the similarity of variables and the smaller the stem length the higher the similarity.

Looking at the dendrogram 200 of FIG. 9 reveals three types of relations. A first type of relationship includes variables with high similarity from the same class. This type of high-correlation relationship can be used for data reduction. In this regard, since the variables have such a high degree of similarity, it is possible to omit some of them from the dataset and rely on the remaining variables. For example, the median of a variable and the average of a variable often have a very short stem such that one of them can be omitted, depending on the analysis preferences. A second type of relationship includes variables with high similarity from different classes. This type of relationship is particularly useful for knowledge discovery. In this regard, variables from different classes (e.g., different data types and/or data sources) with high similarity may reveal hidden patterns or correlations that are useful in defining a predictive model. Finally, a third type of relationship includes variables with very low similarity. In this regard, in some instances very low similarity (e.g., 0.2 or lower) variables can be deleted from the data set. In some implementations, all of the variables are taken into consideration and those having a low similarity are removed from the data set.

Referring again to FIG. 6, other cluster analysis methods may also be used for knowledge discovery and pattern recognition. For example, in some instances self-organizing maps 166, which are unsupervised neural networks used to produce a low-dimensional map of the data space, may be used. FIG. 10 shows an exemplary self-organizing map 210. The unsupervised learning nature of the self-organizing maps helps to discover hidden patterns in the data. Self-organizing maps clustering enforces neighborhood relationships on the resulting cluster centroids. Thus, clusters that are neighbors are more related to one another than clusters that are not neighbors. This greatly facilitates interpretation of hidden relationships. In some embodiments, self-organizing maps are used to visualize relationships within the input data set. In this regard, where production data is an output of the resulting predictive model, the production data is excluded from at least some of the self-organizing maps such that the relationships among the input data can be visualized. In this regard, the self-organizing mapes are used as a classification tool for the input data. Referring again to FIG. 6, in some instances fuzzy clustering or logic 168 and/or support vector machines are used. Similar to self-organizing maps, the fuzzy logic 168 and support vector machines seek to extract relationships in the data. Depending on the size of the dataset a combination of clustering algorithms can be used to both reduce the size of the data set and extract information. In some instances, clustering wells based on their respective physical locations and production data can reveal possible variations in reservoir quality and/or factors that have an acute effect on production.

Referring again to FIG. 3, with the data screened and processed, the method 120 continues to step 128 where data modeling is performed, which leads to model selection at step 130 and then model application at step 132. In this regard, at the data modeling stage 128, neural networks are trained and tested thousands of times with the help of genetic algorithms to generate a plurality of predictive models. In some instances, final model is selection is done at step 130 based on two main criteria: performance of each predictive model, and engineering validation derived from the process knowledge. The final or "best" predictive model, which may also be referred to as a "neural network" or "network," can be utilized to understand the behavior of fractures and the possible improvements of their design as applied to a particular well at step 132. In this regard, in some instances the model application at step 132 includes knowledge discovery in which neural network sensitivity analysis reveals hidden correlations within the data.

Referring to FIG. 11, aspects of the data modeling step 128 will be discussed. In this regard, FIG. 11 provides examples of the types of data modeling utilized in the context of the present disclosure, however, no limitation is intended thereby. Rather, it is understood that the methods and systems of the present disclosure can utilize other types of data modeling, especially those suitable for using correlations between data parameters of a known dataset to predict future outcomes associated with a partially-known dataset. Accordingly, one of ordinary skill in the art will recognize that extension of the methods and systems of the present disclosure to types of data modeling not explicitly described within the present disclosure is within the scope of the present disclosure.

Generally speaking, the objective of the data modeling step 128 is to build a predictive tool based on the processed dataset obtained from the previous steps 122, 124, and 126. In this regard, a predictive model provides a tool to establish a relationship between the various parameters of the data and help understand the behavior of the data. Accordingly, in some instances artificial neural networks 220 are used as a main modeling tool. Neural networks are nonlinear pattern recognition tools. Neural networks require training to be able to understand relationship between inputs and outputs of a known dataset. In this regard, in some instances the inputs and outputs are selected and/or defined based on one or more of the available data for an uncompleted well, the available data for completed wells in a field, desired output parameters, and/or combinations thereof. In the training stage, the inputs and desired outputs are fed to the neural network and, through the application of a learning algorithm, prediction errors are minimized to the extent possible for each neural network. In this regard, hundreds, thousands, tens of thousands, and/or more neural networks, which may also be referred to as predictive models, are generated based on the obtained, screened, and processed dataset. After successful training, each neural network can be tested and/or evaluated utilizing known inputs and outputs that were omitted from the training step. To this end, in some instances data associated with a particular subset of wells in the available dataset are withheld as a testing group. Accordingly, in some instances the dataset is separated into a first set of data for training and a second, separate set of data for testing. In some instances, between about 10% and about 50% of the number of wells in a dataset is held back for the test group, with some implementations holding back 30% for the test group. Generally, the closer a particular neural network is at predicting the actual outputs from the known inputs for the testing data, the better the neural network fits the dataset.

Part of the data modeling step 128 is determining what combination of inputs should be used to construct the neural network. In some instances, the input combinations are determined in two parts. First, an initial combination of data parameters is selected in such a way as to represent geology, wellbore condition, completion, stimulation, and fluid properties. Then, by the use of one or more genetic algorithms 222 thousands of neural networks are trained with different combinations of inputs. In some embodiments, the outputs of neural networks are production data (e.g., oil, gas, and/or water production). In some instances, the training goal is a network error of $10^{-5}$ or less. The error function for this purpose is average absolute error. Each network is tested on the test dataset that is not presented to networks during the training stage. The advantage of testing of the trained networks is to evaluate the performance of the training. In that regard, FIG. 15 provides a graph 260 that shows estimated well production based on a trained predictive model relative to the actual well production. In some embodiments, a commercially available neural network software program, such as NeuroGenetic Optimizer™ ("NGO") developed by Bio-Comp Systems, Inc. and/or other suitable software program, is utilized for performing aspects of method 120, including all or portions of data modeling step 128 and/or model selection step 130.

In some instances, the data modeling step 128 also includes application of one or more boosted regression trees 224. In this regard, boosted regression trees generate predictive models similar to neural networks. However, neural networks are generally more flexible and have improved pattern recognition compared to boosted regression trees. Therefore, in some implementations the boosted regression tree 224 is used to define single output models (i.e., models having one target output, such as total hydrocarbon production) and/or cross-validate the results of the models generated from the neural networks 220.

Once the training and testing of the neural networks are complete, often many (e.g., hundreds) of the neural networks pass an initial model selection criteria. In some instances, the mean squared error of all of the networks is compared and the models with the least error are selected and passed along to the next step of network selection. Typically, the goal is to reduce the suitable neural networks down to one "best" neural network that is selected as a final network. There are many ways of selecting a final network. Referring now to FIG. 12, shown therein are aspects of a model selection step 130 according to embodiments of the present disclosure, however, no limitation is intended thereby. Rather, it is understood that the methods and systems of the present disclosure can utilize generally any type of model selection to select a best or final model from a plurality of available models. Accordingly, one of ordinary skill in the art will recognize that extension of the methods and systems of the present disclosure to types of model selection not explicitly described within the present disclosure is within the scope of the present disclosure.

As an initial step in identifying a best or final neural network, the available neural networks are compared to a set of desired performance criteria. In some instances, the mean squared errors of the networks are compared. In some instances, the error with respect to particular parameters may be weighted more heavily than other parameters in the evaluation. For example, in some instances the parameters that are more directly correlated to the output(s) of the predictive model are weighted more heavily. The neural networks with the least error are identified and passed to the next step of network selection. Those neural networks not meeting the performance criteria are removed from contention.

In some instances and as shown in FIG. 12, engineering judgment or validation 228 is also utilized as an initial step of network selection. In this regard, neural networks that rely on relationships or correlations that are contrary to well-established engineering principles and/or otherwise do not make logical sense from an engineering standpoint are removed from consideration. For example, in some instances fracture gradient, average total gas, formation depth and their relationships with production data can be used for screening the predictive models.

Figure 14:
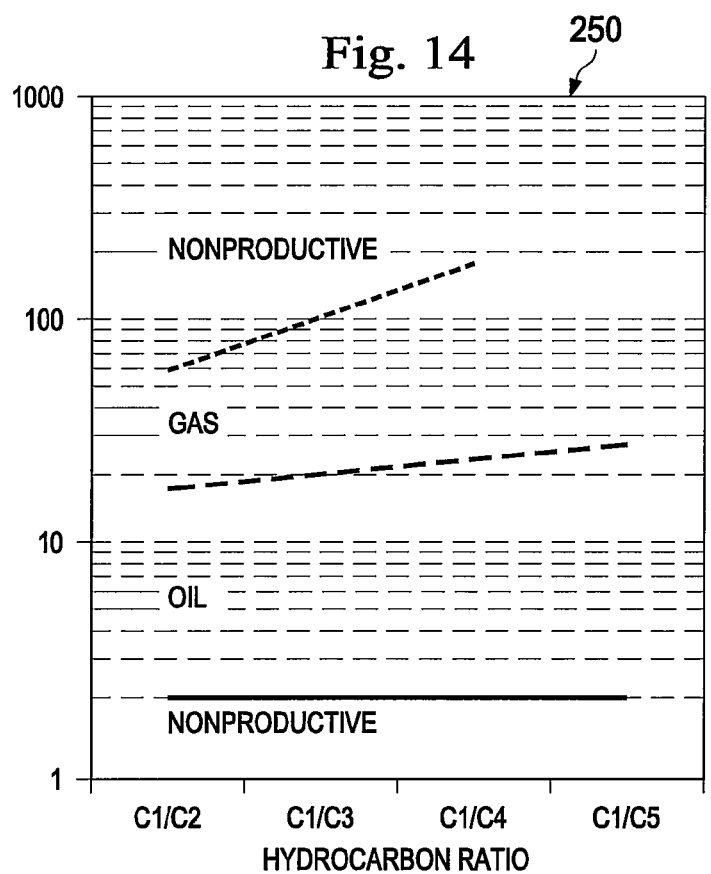
FIG. 14 is a graph illustrating a manner of evaluating a formation using hydrocarbon ratios according to an embodiment of the present disclosure.

Also, the information obtained in the data processing step 126 (e.g., multivariate analysis and/or cluster analysis) as shown in FIG. 6 can be very useful for selecting a final neural network, which may be referred to as using process knowledge 230 (e.g., knowledge obtained from the data screening/analysis processes). In some instances, data from mud logs used for formation evaluation can be used to narrow down the neural networks. In particular, hydrocarbon ratios of the drilling mud gas can be used to predict whether a zone will produce oil, gas and/or water. In this regard, FIG. 14 shows a graph 250 with exemplary plots of hydrocarbon ratios, specifically based on $C_1/C_2$ (methane/ethane), $C_1/C_3$ (methane/propane), $C_1/C_4$ (methane/butane) and $C_1/C_5$ (methane/pentane) ratios, for non-productive and productive wells. This type of mud log data is typically available for most of the well. However, such data has not been used to optimize the design of the completion, including hydraulic fracturing parameters, of wells. In accordance with the present disclosure, these hydrocarbon ratios can be utilized as a proxy for wellbore data parameters that are often unavailable, such as permeability, to facilitate completion optimization. In this regard, drilling mud gas content, alkane fractions, and/or other mud log data will be evaluated in the data-driven model development process to determine its usefulness in estimating and predicting production. Accordingly, in some instances, neural networks that take into account these hydrocarbon ratios are preferred and, therefore, rated higher than those neural networks that do not utilize hydrocarbon ratios. Thus, in some instances the neural networks that do not utilize hydrocarbon ratios are removed from contention as the best or final neural network, either manually by a user or automatically by the computer system in response to instructions stored in a non-transitory computer readable medium executed by the computer system.

In some instances, selection of a final neural network also includes conducting sensitivity analysis 232 on neural network predictions on the inputs. This type of analysis may reveal unrealistic, over-sensitive relationships between inputs and outputs due to the training of the neural network to match the provided dataset. In some instances, sensitivity analysis is performed by adding and/or subtracting a percentage (e.g., 5-20% in some implementations and 10% in some implementations) of the range of each input while keeping the rest of the inputs unchanged. Then, the neural network is tested with each dataset and average values of outputs are calculated. By calculating the percentage of change in outputs, sensitivities are identified. To this end, an exemplary chart 270 showing the relative sensitivities of various parameters to production parameters is provided in FIG. 16. Further, the chart 270 also indicates the relative sensitivities of parameters that are controllable (e.g., well completion and hydraulic fracturing design parameters) and those that are non-controllable, reservoir defined properties (e.g., gas production and mud weight).

Figure 13:
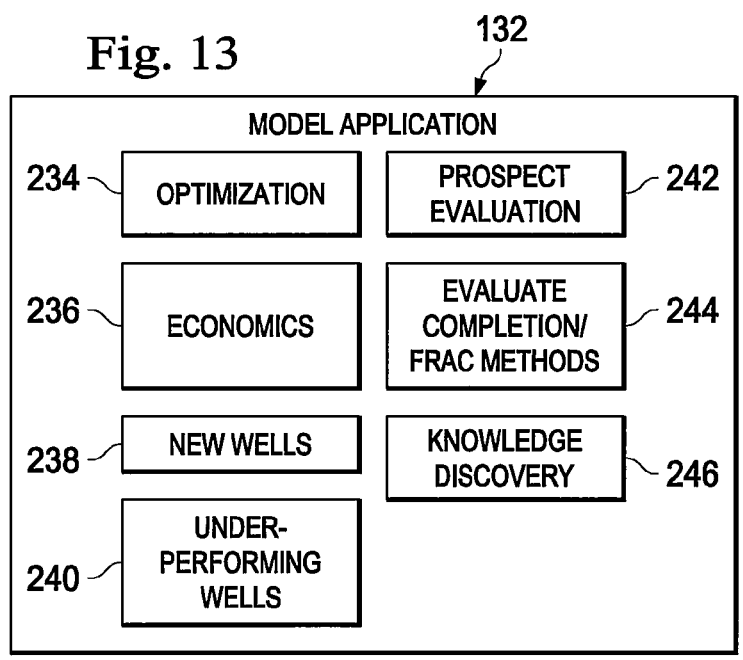
FIG. 13 is a diagram illustrating aspects of a model application step of the method illustrated in the flow chart of FIG. 3 according to an embodiment of the present disclosure.

Referring again to FIG. 3, with a final model selected at step 130, the method 120 continues at step 132 with application of the selected final neural network. In this regard, FIG. 13 provides examples of how the selected model is applied in the context of the present disclosure, however, no limitation is intended thereby. Rather, it is understood that the methods and systems of the present disclosure can apply the selected model to a wide array of uses for evaluating existing wells, prospective wells, and/or completed wells. Accordingly, one of ordinary skill in the art will recognize that extension of the methods and systems of the present disclosure to other uses of the predictive models not explicitly described within the present disclosure is within the scope of the present disclosure.

After the neural network has been trained, tested, and selected as the final neural network, the neural network can be utilized to optimize the wellbore fracturing and completion parameters 234. In some instances, the optimized wellbore completion parameters identified using the selected predictive model are output in human-intelligible form such that those parameters can be implemented for completion of the well. In this regard, it is understood that human-intelligible formats include visual displays (e.g., including two-dimensional and/or three-dimensional images/video provided on a display and/or printed on paper or other medium), audible sounds (e.g., analog and/or digital recordings stored in a readable format on a storage medium and/or played over speaker(s)), texture (e.g., braille), and/or combinations thereof.

The final neural network can also be utilized for economic evaluations 236 associated with well completion, well drilling, well operation, and/or other aspects related to existing, completed, or prospective wells. In this regard, the predictive models of the present disclosure can be utilized to evaluate and optimize new wells 238 (e.g., well placement, depth, profile, and/or completion), evaluate and optimize underperforming existing wells 240 (e.g., determine whether improved completion design parameters can improve well production in a profitable manner), evaluate and optimize prospective well locations 242 (e.g., desired well placement, depth, profile, and/or completion), evaluate completion design parameters 244, including hydraulic fracturing designs, for completed wells (e.g., evaluate utilized parameters to resulting production for wells having similar profiles), and knowledge discovery 246 (e.g., identifying hidden and/or unexpected relationships between well/field/reservoir properties, completion designs, and/or other factors with well production).

An example of a real-world implementation of optimization 234 and economic analysis 236 in accordance with the present disclosure will now be described with reference to FIGS. 17 and 18. In this regard, the optimization was performed for a Bakken Well in Dunn County, North Dakota, referred to as well "A," in which the horizontal lateral was drilled to a length of 9,400 ft. The total gas measured during horizontal drilling operations averaged 2,400 units. The $C_1/C_4$ gas ratio was 3, which indicated that the wellbore penetrated very high quality reservoir rock. A service company had proposed to stimulate well "A" with 40 hydraulic fracturing treatments using a total of 5,300,000 lb. of 20/40 ceramic proppant placed with approximately 4,000,000 gallons of cross-linked fluid and 400,000 gallons of linear gel. The estimated cost of this proposed stimulation was around $6,600,000.

Utilizing the techniques of the present disclosure, evaluation of the proposed completion with an artificial neural network model took less than 1 day and was performed using a dataset consisting of the digital mud log for well "A", a directional survey, and hydraulic fracturing cost data. As a result of the neural network predictive model, it was estimated that comparable production and recovery could be achieved by reducing treatment volume. Further, the predictive model indicated that the number of hydraulic fracturing stages could be reduced from 40 to 30 without significant loss of production. FIG. 17 shows a graph 280 that plots the estimated production and recovery predictions made by the predictive model using the reduced treatment volumes for various numbers of hydraulic fracturing stages. As can be seen, at about 30 hydraulic fracturing treatments, the incremental best month oil cumulative production gain for each additional hydraulic fracturing treatment becomes insignificant. For example, the predictive model estimated that with 30 hydraulic fracturing treatments, a best month oil production of 27,213 BBL and estimated ultimate recovery ("EUR") of 854,550 BBL, while 40 hydraulic fracturing treatments would only obtain a slight increase to a best month oil production of 27,798 BBL and EUR of 860,967 BBL. Comparison of this behavior to the numeric reservoir modeling indicates that this production behavior is consistent with 0.05 micro-darcy range permeability reservoir rock.

A production profile for each available combination of hydraulic fracturing parameters was synthesized using the neural network model to estimate the best month Cumulative oil production and oil recovery. In this regard, FIG. 18 includes a graph 290 that illustrates the net present value calculated using this approach (using a net oil price of $60/BBL and a water disposal cost of $5/BBL) relative to the number of fracturing stages. As can be seen the economic break point for well "A" occurs at about 30 hydraulic fracturing treatments. This information was used to justify completion of well "A" using 30 hydraulic fracturing treatments, a treatment volume of approximately 3,350,000 gal placing 3,050,000 lb. of proppant. As a result, the actual best month cumulative production achieved by well "A" was approximately 36,000 BBL oil, which is one of the best wells in the area.

Another example of a real-world implementation of optimization 234 and economic analysis 236 in accordance with the present disclosure will now be described with reference to FIGS. 19 and 20. In this regard, the optimization was performed for a Bakken Well in Divide County, North Dakota, referred to as well "B," in which the horizontal lateral was drilled to a length of 9,495 ft. The total gas measured during horizontal drilling operations averaged 470 units. The $C_1/C_4$ gas ratio was 4.5, which indicated that this wellbore penetrated moderate quality reservoir rock. It was proposed to stimulate this well with 24 hydraulic fracturing treatments using the "plug and perf" hydraulic fracturing staging method.

Utilizing the techniques of the present disclosure, evaluation of the proposed completion with an artificial neural network model took less than 1 day and was performed using a dataset consisting of the digital mud log for well "B", a directional survey, and hydraulic fracturing cost data. As a result of the neural network predictive model, it was predicted that this well would benefit from more hydraulic fracture stimulation. It also indicated that the number of hydraulic fracturing stages could be increased from 24 to 45 with a corresponding significant increase in production. FIG. 19 shows a graph 300 that plots the estimated production and recovery predictions made by the predictive model using different numbers of hydraulic fracturing treatments. As can be seen, the optimum number of treatments appears to be 45 or greater as there is no break over in production with more hydraulic fracturing treatments. Comparison of this result to numeric reservoir modeling shows that this behavior is consistent with reservoir rock in the 5 micro-darcy range.

A production profile for each available combination of hydraulic fracturing parameters was synthesized using the neural network model to estimate the best month cumulative oil production and oil recovery. In this regard, FIG. 20 includes a graph 310 that illustrates the net present value calculated using this approach (using a net oil price of $60/BBL and a water disposal cost of $5/BBL) relative to the number of fracturing stages. As can be seen there is no economic break over for up to 45 hydraulic fracturing treatments on this well. Unfortunately, it was too late to change the completion on well "B" using the data from the predictive model. Well "B" was completed using 24 hydraulic fracturing treatments, a total proppant amount of 2,990,000 lb. consisting of 40/70 sand, 20/40 sand, and 20/40 ceramic. The proppant was placed with approximately 1,420,000 gal of cross-linked fluid. The best month cumulative production achieved by this well was approximately 9,595 BBL of oil, which is in close agreement with the estimate of the predictive model, which estimated 9,188 BBL of oil for 24 hydraulic fracturing treatments.

Referring now to FIG. 21, shown therein is a graph 320 illustrating actual oil recovery from a well relative to a predicted oil recovery based on a predictive model according to an embodiment of the present disclosure. In this regard, a predictive model in accordance with the present disclosure was used to predict production for 10 wells that were part of a project to evaluate the effectiveness of various completion and hydraulic fracturing methods. Graph 320 compares the data-driven model predicted production relative to the actual best calendar month oil production for these wells, which are located in McKenzie County, North Dakota (Truax area) and Divide/Williams Counties, North Dakota (Wildrose area). The line drawn represents a perfect correlation between the model and actual production. Data points that fall below the line indicate a model over-prediction of production, while data points that fall above the line indicate a model under-prediction. As can be seen, the model is predicting the production for the four wells located in the Truax area and three of the six wells in the Wild Rose area with good accuracy. However, the productions of the three wells 322 in the Wild Rose area are over predicted by the model. In this regard, it appears that the model over-prediction for these wells is due to factors that contribute to ineffective hydraulic fracture stimulation. Specifically, the over-prediction is believed to be due to parameters that were not available in the dataset for development of the predictive model. In particular, 3-D fracture modeling of these three wells indicated that excessive out of zone fracture propagation resulted in less effective stimulation.

In some implementations, a method of optimizing wellbore completion in accordance with the present disclosure comprises: gathering data regarding a plurality of completed wellbores; gathering data regarding an uncompleted wellbore; utilizing the gathered data regarding the plurality of completed wellbores in the field to define a plurality of predictive models, each of the plurality of predictive models providing an estimate of wellbore production based on the gathered data regarding the plurality of completed wellbores; identifying a best predictive model from the plurality of predictive models; and applying the gathered data regarding the uncompleted wellbore and a plurality of available wellbore completion parameters to the best predictive model to identify a set of wellbore completion parameters from the plurality of available wellbore completion parameters that optimizes estimated wellbore production based on the best predictive model; and completing the uncompleted wellbore based on the set of wellbore completion parameters identified using the best predictive model. In some instances, the uncompleted wellbore and the plurality of completed wellbores are from a single, common field. In other instances, the uncompleted wellbore and the plurality of completed wellbores are from a plurality of fields. For example, in some implementations at least one of the plurality of completed wellbores is from a first field and the uncompleted wellbore is from a second field different than the first field.

In some instances, the gathered data regarding the plurality of completed wellbores and/or the gathered data regarding the uncompleted wellbore comprises mud log data. In some embodiments, utilizing the gathered data regarding the plurality of completed wellbores to define the plurality of predictive models comprises applying the gathered data regarding the plurality of completed wellbores to an artificial neural network. In that regard, in some implementations applying the gathered data regarding the plurality of completed wellbores to the artificial neural network includes applying the data gathered for a first set of completed wellbores from the plurality of completed wellbores to the artificial neural network, wherein the first set of the plurality of completed wellbores is less than all of the plurality of completed wellbores. Further, in some instances identifying the best predictive model from the plurality of predictive models comprises applying the data gathered for a second set of completed wellbores from the plurality of completed wellbores to the plurality of predictive models, the second set of completed wellbores being different than the first set of completed wellbores. Also, in some embodiments identifying the best predictive model from the plurality of predictive models further comprises evaluating each of the plurality of predictive models relative to one or more evaluation factors. In this regard, the one or more evaluation factors may include factors selected from the group of factors consisting of number of data input parameters and whether the predictive model utilizes hydrocarbon ratios. In some instances, predictive models with a lower number of data input parameters and/or that utilize at least one hydrocarbon ratio are favored. In some instances, the one or more evaluation factors further includes parameter sensitivity.

The set of wellbore completion parameters that optimizes estimated wellbore production includes a total number of hydraulic fractures in some embodiments. In this regard, in some instances the set of wellbore completion parameters that optimizes estimated wellbore production further includes hydraulic fracture spacings along the uncompleted well. The hydraulic fracture spacings may be consistent or vary along the uncompleted well. In some embodiments, the set of wellbore completion parameters that optimizes estimated wellbore production further includes hydraulic fracture volumes, hydraulic fracture fluid type, hydraulic fracture proppant type, hydraulic fracture staging type, and/or other parameters regarding hydraulic fracture completion of the well. In some instances, utilizing the gathered data regarding the plurality of completed wellbores in the field to define the plurality of predictive models includes identifying correlating factors. To this end, multivariate analysis and/or cluster analysis may be used to identify correlating factors. In some instances, the identification of correlating factors includes generating one or more visual representations of the gathered data selected from the group of visual representations consisting of a scatter plot, a bi-plot, a dendrogram, and a self-organizing map.

In some embodiments, a computer-implemented system for optimizing wellbore completion is provided. The system includes non-transitory, computer readable medium having a plurality of instructions stored thereon for executing the following steps: receiving data regarding a plurality of completed wellbores in a field; receiving data regarding an uncompleted wellbore in the field; utilizing the gathered data regarding the plurality of completed wellbores in the field to define a plurality of predictive models, each of the plurality of predictive models providing an estimate of wellbore production based on the gathered data regarding the plurality of completed wellbores; identifying a best predictive model from the plurality of predictive models; applying the gathered data regarding the uncompleted wellbore and a plurality of available wellbore completion parameters to the best predictive model to identify a set of wellbore completion parameters from the plurality of available wellbore completion parameters that optimizes estimated wellbore production based on the best predictive model; and outputting the set of wellbore completion parameters identified using the best predictive model in human-intelligible form.

Those of ordinary skill in the art will also recognize that the methods and systems described above can be modified in various ways. Accordingly, those of ordinary skill in the art will appreciate that the embodiments encompassed by the present disclosure are not limited to the particular exemplary embodiments described above. In this regard, while illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A method, comprising:
    gathering a first data collection regarding a plurality of completed horizontal wellbores, the first data collection comprising gas chromatograph measurements of alkanes, mud log data, rate of penetration, average mud weight, total gas, bottomhole temperature, vertical depth, azimuth, well inclination, or lateral orientation or any combination thereof;
    gathering a second data collection regarding an uncompleted horizontal wellbore, the second data collection comprising gas chromatograph measurements of alkanes, mud log data, rate of penetration, average mud weight, total gas, bottomhole temperature, vertical depth, azimuth, well inclination, or lateral orientation or any combination thereof;
    applying a first portion of the first data collection to a plurality of artificial neural networks stored onto a non-transitory computer readable medium, wherein the first portion is gathered from a first set of completed horizontal wellbores from the plurality of completed horizontal wellbores, wherein the first set of the plurality of completed horizontal wellbores is less than all of the plurality of completed horizontal wellbores;
    applying one or more genetic algorithms stored onto the non-transitory computer readable medium to train each of the plurality of artificial neural networks in order to generate a plurality of predictive models, each of the plurality of predictive models providing an estimate of wellbore production based on the first data collection;
    identifying a best predictive model from the plurality of predictive models by applying a second portion of the first data collection to the plurality of predictive models, wherein the second portion is gathered from a second set of completed horizontal wellbores from the plurality of completed horizontal wellbores, wherein the second set of completed horizontal wellbores is different from the first set of completed horizontal wellbores;
    applying the gathered second data collection regarding the uncompleted horizontal wellbore and a plurality of available wellbore completion parameters to the best predictive model to identify a set of wellbore completion parameters from the plurality of available wellbore completion parameters that optimizes estimated wellbore production based on the best predictive model;
    outputting the set of wellbore completion parameters identified using the best predictive model in human-intelligible form; and
    hydraulically fracturing the uncompleted horizontal wellbore based on the set of wellbore completion parameters identified using the best predictive model.

2. The method of claim 1, wherein the gathered data regarding the plurality of completed horizontal wellbores comprises mud log data.

3. The method of claim 2, wherein the gathered data regarding the uncompleted horizontal wellbore comprises mud log data.

4. The method of claim 1, wherein identifying the best predictive model from the plurality of predictive models further comprises evaluating each of the plurality of predictive models relative to one or more evaluation factors.

5. The method of claim 4, wherein the one or more evaluation factors include factors selected from the group of factors consisting of number of data input parameters and whether the predictive model utilizes hydrocarbon ratios.

6. The method of claim 5, wherein predictive models with a lower number of data input parameters are favored.

7. The method of claim 5, wherein predictive models that utilize at least one hydrocarbon ratio are favored.

8. The method of claim 5, wherein the one or more evaluation factors further includes parameter sensitivity.

9. The method of claim 1, wherein the set of wellbore completion parameters that optimizes estimated wellbore production includes a total number of hydraulic fractures.

10. The method of claim 9, wherein the set of wellbore completion parameters that optimizes estimated wellbore production further includes hydraulic fracture spacings along the uncompleted horizontal wellbore.

11. The method of claim 10, wherein the hydraulic fracture spacings vary along the uncompleted horizontal wellbore.

12. The method of claim 1, wherein the set of wellbore completion parameters that optimizes estimated wellbore production further includes hydraulic fracture volumes.

13. The method of claim 1, wherein the set of wellbore completion parameters that optimizes estimated wellbore production further includes hydraulic fracture fluid type.

14. The method of claim 1, wherein the set of wellbore completion parameters that optimizes estimated wellbore production further includes hydraulic fracture proppant type.

15. The method of claim 1, wherein the set of wellbore completion parameters that optimizes estimated wellbore production further includes hydraulic fracture staging type.

16. The method of claim 1, wherein utilizing the gathered data regarding the plurality of completed horizontal wellbores Vie-field to define the plurality of predictive models includes identifying correlating factors.

17. The method of claim 16, wherein identifying correlating factors includes applying multivariate analysis.

18. The method of claim 16, wherein identifying correlating factors includes applying cluster analysis.

19. The method of claim 16, wherein identifying correlating factors includes generating one or more visual representations of the gathered data selected from the group of visual representations consisting of a scatter plot, a bi-plot, a dendrogram, and a self-organizing map.

20. The method of claim 1, wherein the uncompleted horizontal wellbore and the plurality of completed horizontal wellbores are within a single field.

21. The method of claim 1, wherein the uncompleted wellbore and the plurality of completed horizontal wellbores are from a plurality of fields.

22. The method of claim 21, wherein at least one of the plurality of completed horizontal wellbores is from a first field and the uncompleted horizontal wellbore is from a second field, the second field being different than the first field.

23. A computer-implemented system for optimizing wellbore completion, the system including a non-transitory, computer readable medium having a plurality of instructions stored thereon for executing the following steps:
  receiving a first data collection regarding a plurality of completed horizontal wellbores in a field, the first data collection comprising gas chromatograph measurements of alkanes, mud log data, rate of penetration, average mud weight, total gas, bottomhole temperature, vertical depth, azimuth, well inclination, or lateral orientation or any combination thereof;
  receiving a second data collection regarding an uncompleted horizontal wellbore, the second data collection comprising gas chromatograph measurements of alkanes, mud log data, rate of penetration, average mud weight, total gas, bottomhole temperature, vertical depth, azimuth, well inclination, or lateral orientation or any combination thereof;
  applying a first portion of the first data collection to a plurality of artificial neural networks stored onto the non-transitory computer readable medium, wherein the first portion is gathered from a first set of completed horizontal wellbores from the plurality of completed horizontal wellbores, wherein the first set of the plurality of completed horizontal wellbores is less than all of the plurality of completed horizontal wellbores;
  applying one or more genetic algorithms stored onto the non-transitory computer readable medium to train each of the plurality of artificial neural networks in order to generate a plurality of predictive models, each of the plurality of predictive models providing an estimate of wellbore production based on the first data collection;
  identifying a best predictive model from the plurality of predictive models by applying a second portion of the first data collection to the plurality of predictive models, wherein the second portion is gathered from a second set of completed horizontal wellbores from the plurality of completed horizontal wellbores, wherein the second set of completed horizontal wellbores is different from the first set of completed horizontal wellbores;
  applying the gathered second data collection regarding the uncompleted horizontal wellbore and a plurality of available wellbore completion parameters to the best predictive model to identify a set of wellbore completion parameters from the plurality of available wellbore completion parameters that optimizes estimated wellbore production based on the best predictive model; and
  outputting the set of wellbore completion parameters identified using the best predictive model in human-intelligible form and hydraulically fracturing the uncompleted horizontal wellbore based on the set of wellbore completion parameters identified using the best predictive model.

24. A method, comprising:
  gathering a first data collection regarding a plurality of completed horizontal wellbores in a single field, the first data collection selected from the group consisting of chromatograph measurements of alkanes, mud log data, rate of penetration and any combination thereof;
  gathering a second data collection regarding an uncompleted horizontal wellbore in the field, the second data collection comprising chromatograph measurements of alkanes, mud log data, rate of penetration and any combination thereof;
  applying a first portion of the first data collection to a plurality of artificial neural networks stored onto a non-transitory computer readable medium, wherein the first portion is gathered from a first set of completed horizontal wellbores from the plurality of completed horizontal wellbores, wherein the first set of the plurality of completed horizontal wellbores is less than all of the plurality of completed horizontal wellbores;
  applying one or more genetic algorithms stored onto the non-transitory computer readable medium to train each of the plurality of artificial neural networks in order to generate a plurality of predictive models, each of the plurality of predictive models providing an estimate of wellbore production based on the first data collection;
  identifying a best predictive model from the plurality of predictive models by:
    applying a second portion of the first data collection to the plurality of predictive models, wherein the second portion is gathered from a second set of completed horizontal wellbores from the plurality of completed horizontal wellbores, wherein the second set of completed horizontal wellbores is different from the first set of completed horizontal wellbores; and
    evaluating each of the plurality of predictive models relative to one or more evaluation factors selected from the group of factors consisting of number of data input parameters and whether the predictive model utilizes hydrocarbon ratios, wherein predictive models that utilize at least one hydrocarbon ratio are favored;
  applying the gathered second data collection regarding the uncompleted horizontal wellbore and a plurality of available wellbore completion parameters to the best predictive model to identify a set of wellbore completion parameters from the plurality of available wellbore completion parameters that optimizes estimated wellbore production based on the best predictive model;
  outputting the set of wellbore completion parameters identified using the best predictive model in human-intelligible form; and
  hydraulically fracturing the uncompleted horizontal wellbore within the set of wellbore completion parameters identified using the best predictive model.

25. The method of claim 24, wherein utilizing the gathered data regarding the plurality of completed horizontal wellbores in the field to define the plurality of predictive models includes identifying correlating factors selected from the group consisting of applying multivariate analysis and applying cluster analysis and any combination thereof.

26. The method of claim 25, wherein identifying correlating factors further includes generating one or more visual representations of the gathered data selected from the group of visual representations consisting of a scatter plot, a bi-plot, a dendrogram, and a self-organizing map.

* * * * *